(12) United States Patent
Carlas et al.

(10) Patent No.: US 12,275,151 B2
(45) Date of Patent: Apr. 15, 2025

(54) ROBOT CONTROL SYSTEM AND CONTROL METHOD

(71) Applicant: OMRON CORPORATION, Kyoto (JP)

(72) Inventors: Ferran Carlas, Barcelona (ES); Diego Escudero, Barcelona (ES); Raffaele Vito, Barcelona (ES); Antonio Penalver, Barcelona (ES); David Fornas, Barcelona (ES); Yoshihide Tamura, Kyoto (JP); Taku Oya, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 236 days.

(21) Appl. No.: 17/908,107

(22) PCT Filed: Dec. 17, 2020

(86) PCT No.: PCT/JP2020/047242
§ 371 (c)(1),
(2) Date: Aug. 30, 2022

(87) PCT Pub. No.: WO2021/181801
PCT Pub. Date: Sep. 16, 2021

(65) Prior Publication Data
US 2023/0101517 A1      Mar. 30, 2023

(30) Foreign Application Priority Data
Mar. 13, 2020   (JP) .................................. 2020-044125

(51) Int. Cl.
*B25J 9/16*        (2006.01)
*B25J 13/00*       (2006.01)

(52) U.S. Cl.
CPC ............. *B25J 9/1658* (2013.01); *B25J 13/00* (2013.01)

(58) Field of Classification Search
CPC ........ B25J 9/1658; B25J 13/00; B25J 9/1656; G05B 19/0426; G05B 2219/36513; G05B 2219/39448; G05B 19/0423
See application file for complete search history.

(56) References Cited

U.S. PATENT DOCUMENTS

| | | | | |
|---|---|---|---|---|
| 6,208,104 B1* | 3/2001 | Onoue | ..................... | B25J 9/161 901/6 |
| 2009/0254217 A1* | 10/2009 | Pack | ..................... | G06N 3/008 700/246 |

(Continued)

FOREIGN PATENT DOCUMENTS

| | | |
|---|---|---|
| CN | 109582397 A | 4/2019 |
| EP | 1 004 408 A1 | 5/2000 |

(Continued)

OTHER PUBLICATIONS

International Search Report for PCT/JP2020/047242, dated Mar. 9, 2021.

(Continued)

*Primary Examiner* — Adam R Mott
*Assistant Examiner* — Matthew C Gammon
(74) *Attorney, Agent, or Firm* — Sughrue Mion, PLLC

(57) ABSTRACT

The robot control system includes a first control device and a second control device network-connected to the first control device to control a robot. The first control device includes a selection unit configured to enable any one of a plurality of sources that provide information about generation of a command instructing behavior of the robot, and a first communication unit configured to transmit a command generated according to the information from the enabled source in the plurality of sources to the second control (Continued)

device. The second control device includes a second communication unit configured to receive the command transmitted from the first control device, and a command value generation unit configured to sequentially generate a command value for driving each axis of the robot so as to provide the behavior instructed by the command from the first control device.

14 Claims, 18 Drawing Sheets

(56) References Cited

U.S. PATENT DOCUMENTS

| | | | |
|---|---|---|---|
| 2013/0096697 A1* | 4/2013 | Frazer | G06F 13/126 700/12 |
| 2019/0101904 A1 | 4/2019 | Shimamura et al. | |

FOREIGN PATENT DOCUMENTS

| | | |
|---|---|---|
| JP | 05-334096 A | 12/1993 |
| JP | 2005-202663 A | 7/2005 |
| JP | 2015-501025 A | 1/2015 |
| JP | 2018-196908 A | 12/2018 |
| WO | 2019/013375 A1 | 1/2019 |

OTHER PUBLICATIONS

Written Opinion for PCT/JP2020/047242, dated Mar. 9, 2021.
Extended European Search Report issued Apr. 2, 2024 in Application No. 20924707.1.
Communication dated Nov. 14, 2024, issued in Chinese Application No. 202080097369.2.

* cited by examiner

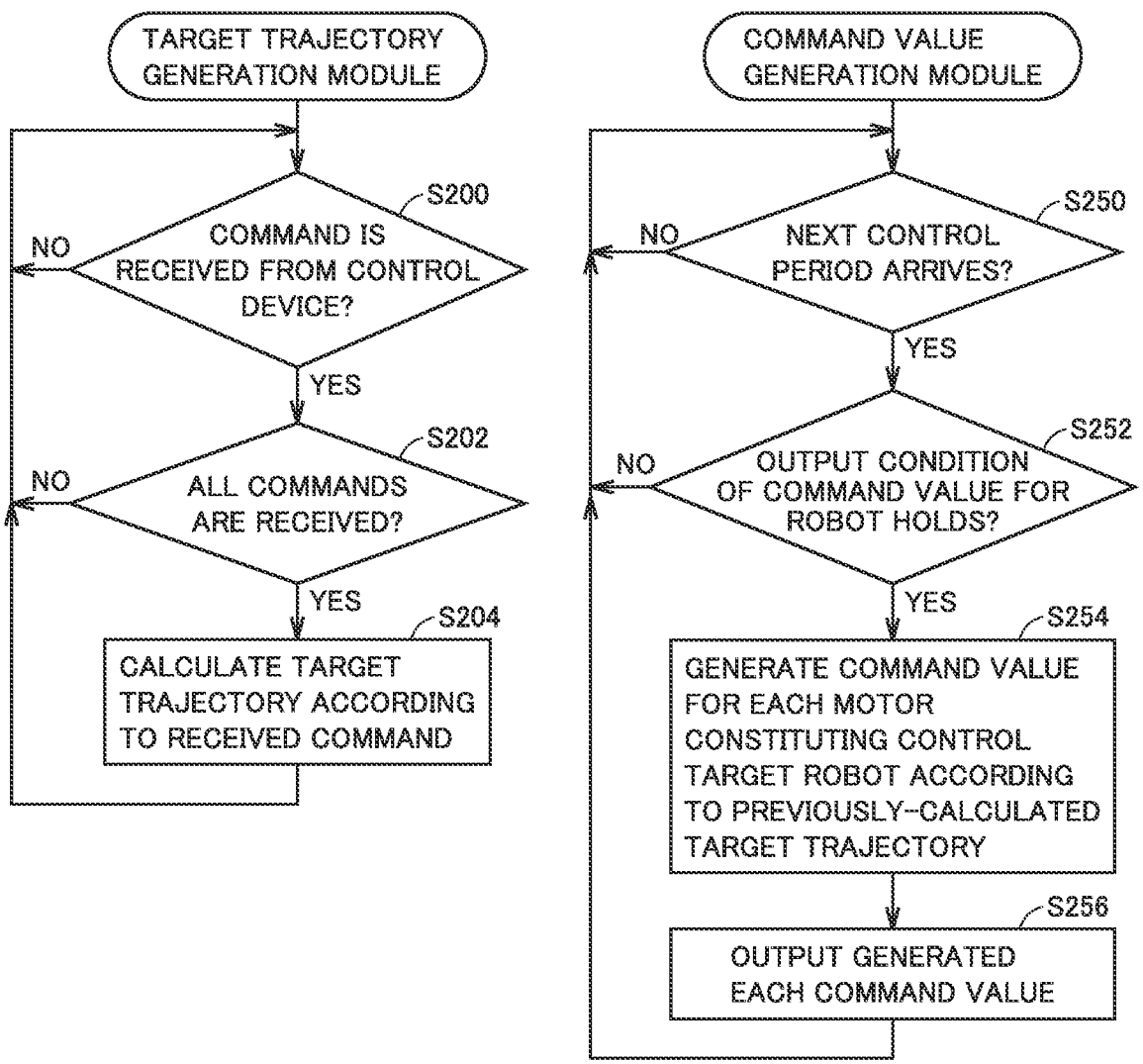

ROBOT CONTROL SYSTEM AND CONTROL METHOD

CROSS REFERENCE TO RELATED APPLICATIONS

This application is a National Stage of International Application No. PCT/JP2020/047242 filed Dec. 17, 2020, claiming priority based on Japanese Patent Application No. 2020-044125 filed Mar. 13, 2020, the contents of each of which being herein incorporated by reference in their entireties.

TECHNICAL FIELD

The present technique relates to a robot control system and a control method.

BACKGROUND ART

Conventionally, a robot has been used for various applications in a factory automation (FA) field.

Generally, a program described in a predetermined programming language is used to control the robot. From the viewpoint of further simplifying the control of the robot, for example, Japanese Patent Laying-Open No. 2018-196908 (PTL 1) discloses a configuration in which an automated facility using the robot is constructed at low cost without learning a robot language.

CITATION LIST

Patent Literature

PTL 1: Japanese Patent Laying-Open No. 2018-196908

SUMMARY OF INVENTION

Technical Problem

The configuration described in CITATION LIST does not simply produce the program described in the robot language, but inputs a parameter to a robot controller to control operation of the robot, thereby reducing construction cost.

However, in an actual production facility, not only the operation according to a previously-produced program but also correspondence to user operation by a teaching pendant or the like are required. The configuration described in CITATION LIST does not assume the case where a plurality of operation instruction sources exist.

An object of the present technique is to provide a robot control system corresponding to the case where a plurality of sources instructing behavior of the robot exist.

Solution to Problem

A robot control system according to an embodiment of the present technique includes a first control device and a second control device network-connected to the first control device to control a robot. The first control device includes a selection unit configured to enable any one of a plurality of sources that provide information about generation of a command instructing behavior of the robot, and a first communication unit configured to transmit a command generated according to the information from the enabled source in the plurality of sources to the second control device. The second control device includes a second communication unit configured to receive the command transmitted from the first control device, and a command value generation unit configured to sequentially generate a command value for driving each axis of the robot so as to provide the behavior instructed by the command from the first control device.

According to this configuration, the first control device enables any source arbitrarily selected in the plurality of sources, and can generate the command according to the information from the enabled source. As a result, the robot control system can be flexibly operated.

The plurality of sources may include a plurality of units among a program interpretation unit configured to sequentially execute a robot program, an operation unit network-connected to the first control device and configured to generate an operation instruction according to a user operation, a development support device connected to the first control device and configured to provide information according to a user operation or program execution, and a program execution unit configured to execute an IEC program.

According to this configuration, not only the robot can be controlled according to the original robot program, but also the robot can be controlled according to the operation instruction from the operation unit, the instruction from the development support device, the execution result of the IEC program, and the like.

The selection unit may enable a specific source according to an instruction given from an outside to the first control device. According to this configuration, the enabled operation can be changed according to the instruction from an information processing device or the like outside the first control device, so that more flexible operation can be implemented.

The selection unit may determine the enabled source according to a predetermined setting. According to this configuration, the operation in which a specific source is prioritized can be performed.

The predetermined setting may include a priority for a source The selection unit may enable the source having a higher priority when information is provided from each of the plurality of sources. According to this configuration, the source that is the generation source of the command can be automatically determined according to the priority order.

The first communication unit may notify the second control device which source is enabled by the selection unit. According to this configuration, in the second control device, the processing can be made different according to the enabled source. This enables the control of the robot according to the enabled source.

The command value generation unit may varies a generation characteristic of the command value for driving each axis of the robot according to which source is enabled by the selection unit. According to this configuration, the robot can be controlled with the characteristic according to the source.

According to another embodiment of the present technique, a control method in a robot control system including a first control device and a second control device network-connected to the first control device and configured to control a robot is provided. The control method includes: enabling, by the first control device, any one of a plurality of sources that provide information about generation of a command instructing behavior of the robot; transmitting, by the first control device, a command generated according to the information from the enabled source in the plurality of sources to the second control device; receiving, by the second control device, the command transmitted from the first control device; and generating, by the second control device, sequentially a command value for driving each axis of the robot so as to provide the behavior instructed by the command from the first control device.

Advantageous Effects of Invention

According to the technique, it is also possible to cope with the case where the plurality of sources instructing the behavior of the robot.

BRIEF DESCRIPTION OF DRAWINGS

FIG. 18 is a flowchart illustrating a processing procedure in a robot controller constituting the robot control system according to the present embodiment.

DESCRIPTION OF EMBODIMENT

Figure 1:
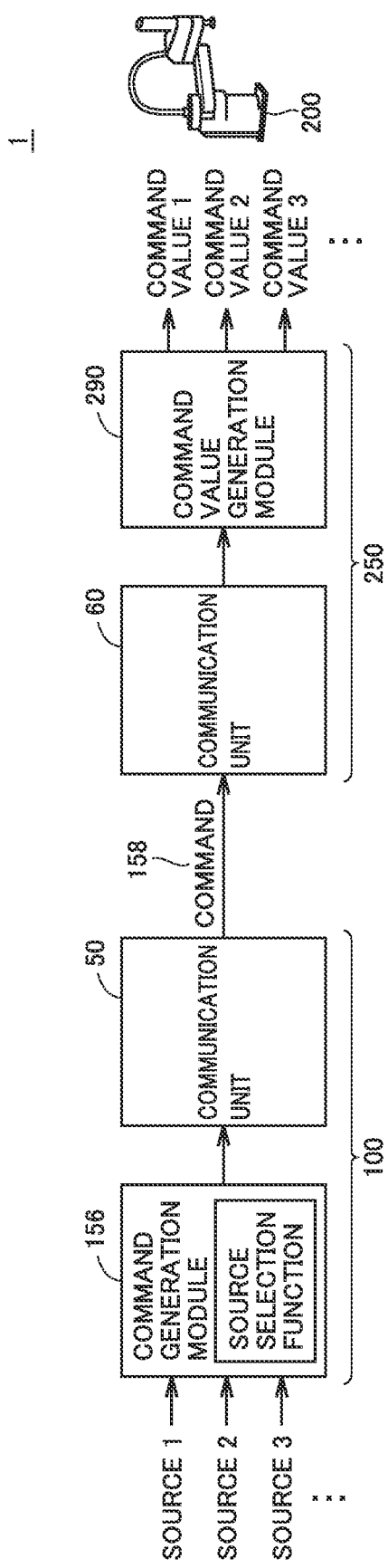
FIG. 1 is a schematic diagram illustrating an outline of a robot control system according to an embodiment.

With reference to the drawings, an embodiment of the technique will be described in detail. The same or equivalent portion in the drawings is denoted by the same reference numeral, and the description will not be repeated.

A. APPLICATION EXAMPLE

An example of a scene to which the technique is applied will be described. FIG. 1 is a schematic diagram illustrating an outline of a robot control system 1 according to an embodiment.

Referring to FIG. 1, robot control system 1 includes a control device 100 (first control device) and a robot controller 250 (second control device) that is network-connected to control device 100 to control a robot 200. A plurality of robot controllers 250 may be connected to control device 100.

In the following description, a configuration example of robot control system 1 that mainly controls robot 200 will be described. However, a control target of robot control system 1 is not limited to robot 200. For example, in addition to robot 200, control device 100 can control various devices and machines constituting a production facility including robot 200. Furthermore, control device 100 may be linked with a safety controller that monitors the operation of robot 200. That is, in the present specification, the term "robot control system" is used in meaning of a system having a function of controlling the robot, but does not exclude the control other than the robot.

Control device 100 includes a command generation module 156 that generates a command 158 instructing behavior of robot 200, and a communication unit 50 (constituted of a field network controller 108, a communication control module 160, a communication driver 162, and the like, which will be described later) that transmits command 158 to robot controller 250.

A plurality of sources that provide information generating command 158 can be connected to command generation module 156.

In the present specification, the "source" means a provider of information about the generation of the command instructing the behavior of robot 200. The information about the generation of the command includes an internal command and/or an operation instruction instructed by the user as described later.

A source selection function 157 (selection unit) of command generation module 156 enables any one of a plurality of sources. Command generation module 156 generates command 158 according to the information from the source enabled by source selection function 157.

Communication unit 50 transmits command 158 generated according to the information from the enabled source in the plurality of sources to robot controller 250.

Robot controller 250 includes a communication unit 60 (constituted of a field network controller 252, a communication control module 280, a communication driver 282, and the like, which are described later) that receives command 158 transmitted from control device 100 and a command value generation module 290 (command value generation unit) that sequentially generates command values driving each axis of robot 200 so as to provide the behavior instructed by command 158 from control device 100.

Because the axis of robot 200 may constitute a joint (joint), the axis is also referred to as "axis or joint" of robot 200 in the following description. That is, in the present specification, the term "axis" of robot 200 is used in meaning including the axis and the joint.

In robot control system 1 according to the present embodiment, the plurality of sources can be selectively enabled, so that robot 200 can be controlled according to not only control by an original robot program 1108 but also information from other sources. As a result, robot control system 1 can be flexibly operated.

B. SYSTEM CONFIGURATION EXAMPLE

A configuration example of robot control system 1 of the embodiment will be described below.

Figure 2:
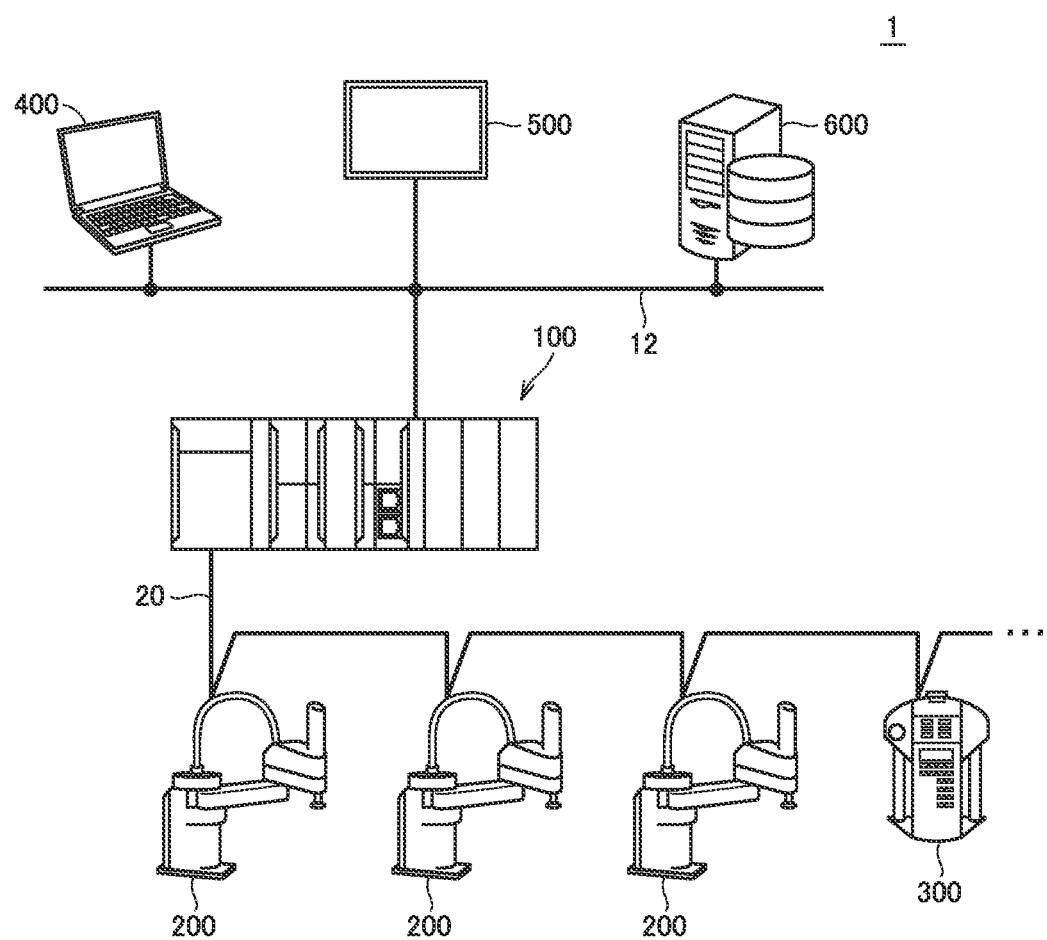
FIG. 2 is a schematic diagram illustrating a configuration example of the robot control system of the embodiment.

FIG. 2 is a schematic diagram illustrating a configuration example of robot control system 1 of the embodiment. Referring to FIG. 2, robot control system 1 of the embodiment includes control device 100 and one or more robots 200 connected to control device 100 through field network 20.

The behavior of each of robots 200 is controlled by robot controller 250. Robot controller 250 is network-connected to control device 100, and controls robot 200. More specifically, robot controller 250 outputs the command value controlling robot 200 according to command 158 from control device 100. A custom robot 200A having one or more axes or joints arbitrarily produced according to an application may be used as robot 200. Furthermore, any general-purpose robot 200B such as a horizontal articulated (scalar) robot, a vertical articulated robot, a parallel link robot, or an orthogonal robot may be used as robot 200.

Any device such as an I/O unit, a safety 110 unit, and a safety controller may be connected to field network 20. In the configuration example of FIG. 2, an operation pendant 300 operating robot 200 is connected to field network 20.

EtherCAT (registered trademark), EtherNet/IP, or the like, which is an industrial network protocol, can be used for field network 20.

Control device 100 may be connected to a support device 400, a display device 500, and a server device 600 through a higher-order network 12. EtherNet/IP or the like that is the industrial network protocol can be used for higher-order network 12.

C. HARDWARE CONFIGURATION EXAMPLE

A hardware configuration example of main devices constituting control system 1 in FIG. 2 will be described below.
(c1: Control Device 100)

Figure 3:
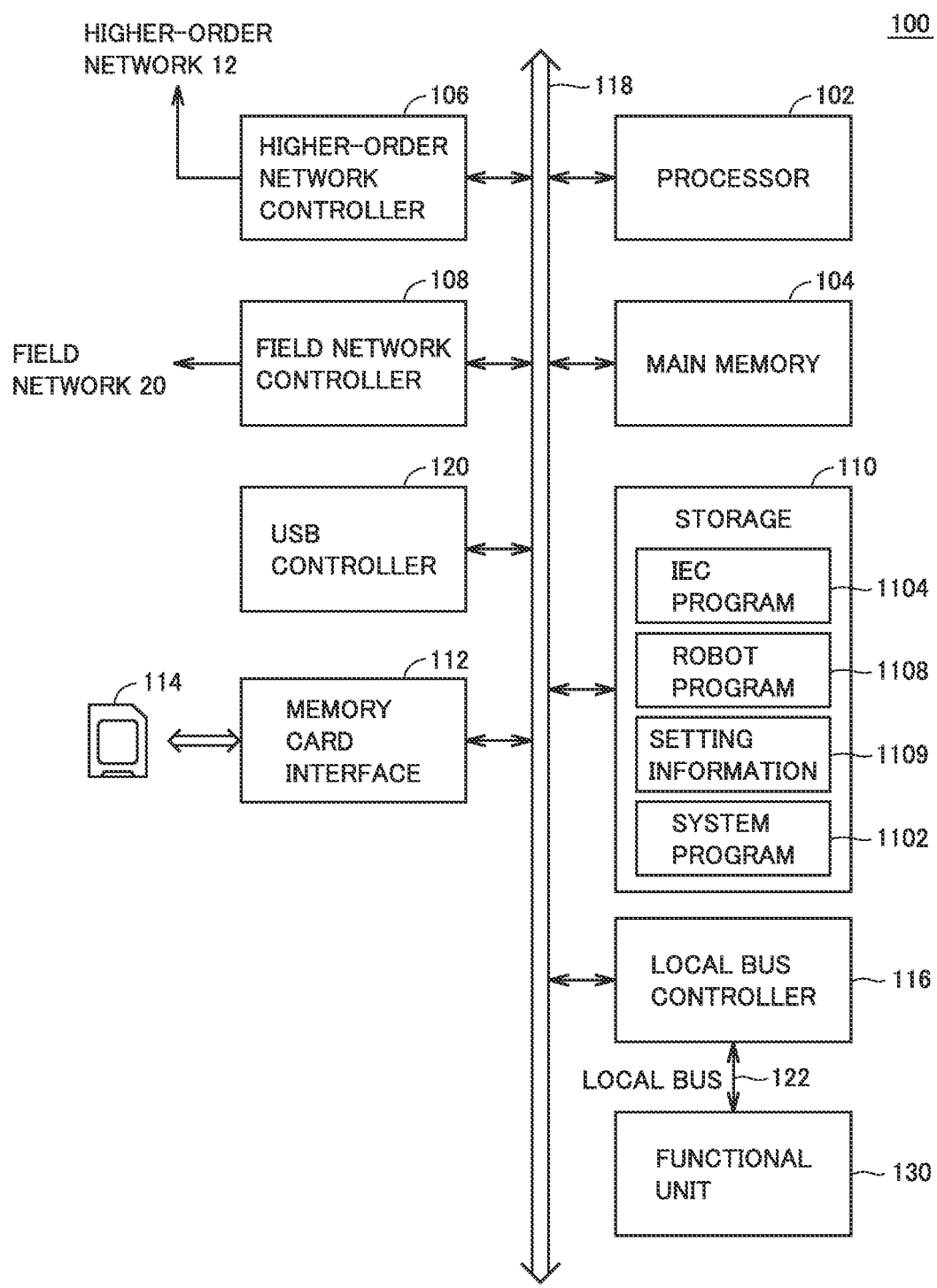
FIG. 3 is a schematic diagram illustrating a hardware configuration example of a control device constituting the robot control system of the embodiment.

FIG. 3 is a schematic diagram illustrating the hardware configuration example of control device 100 constituting robot control system 1 of the embodiment. As illustrated in FIG. 3, control device 100 includes a processor 102, a main memory 104, a storage 110, a memory card interface 112, a higher-order network controller 106, a field network controller 108, a local bus controller 116, and a universal serial bus (USB) controller 120 that provides a USB interface. These components are connected to each other through a processor bus 118.

Processor 102 corresponds to an arithmetic processing unit that executes control arithmetic operation, and is constituted of a central processing unit (CPU), a graphics processing unit (GPU), and the like. Specifically, processor 102 reads various programs stored in storage 110, expands the various programs in main memory 104, and executes the various programs, thereby implementing the control arithmetic operation for the control target.

Main memory 104 includes a dynamic random access memory (DRAM), a static random access memory (SRAM), or the like. Storage 110 is constructed with a nonvolatile storage device such as a solid state drive (SSD) and a hard disk drive (HDD).

A system program 1102 implementing a basic function and an International Electrotechnical Commission (IEC) program 1104 produced according to the control target are stored in storage 110. IEC program 1104 can include a sequence command and/or a motion command.

In the present specification, the "IEC program" is used to mean a program that defines processing executed by a general programmable logic controller (PLC). Typically, the IEC program means a program described in any language defined by IEC 61131-3 defined by the IEC. However, the IEC program may include a program described in a manufacturer own language other than the language defined by IEC 61131-3.

Storage 110 may further store a robot program 1108 and setting information 1109 in order to control the behavior of robot 200. Robot program 1108 may be described in a predetermined programming language (for example, a programming language for robot control such as V+ language or a programming language related to NC control such as G code) as described later. Setting information 1109 includes various setting values (for example, a speed limit value, an acceleration limit value, and a jerk limit value) for robot 200.

Memory card interface 112 receives memory card 114 that is an example of a detachable recording medium. Memory card interface 112 can read and write arbitrary data from and in memory card 114.

Higher-order network controller 106 exchanges the data with an arbitrary information processing device (support device 400, display device 500, server device 600, and the like in FIG. 2) through a high-order network.

Field network controller 108 exchanges data with an arbitrary device such as robot 200 through field network 20. In the system configuration example of FIG. 2, field network controller 108 may function as a communication master of field network 20.

Local bus controller 116 exchanges data with an arbitrary functional unit 130 constituting control device 100 through a local bus 122. For example, functional unit 130 includes an analog I/O unit that is responsible for inputting and/or outputting an analog signal, a digital I/O unit that is responsible for inputting and/or outputting a digital signal, and a counter unit that receives a pulse from an encoder.

USB controller 120 exchanges the data with an arbitrary information processing device through the USB connection.

The function related to the control of robot 200 provided by control device 100 will be described later.
(c2: Robot 200 and Robot Controller 250)

Figure 4:
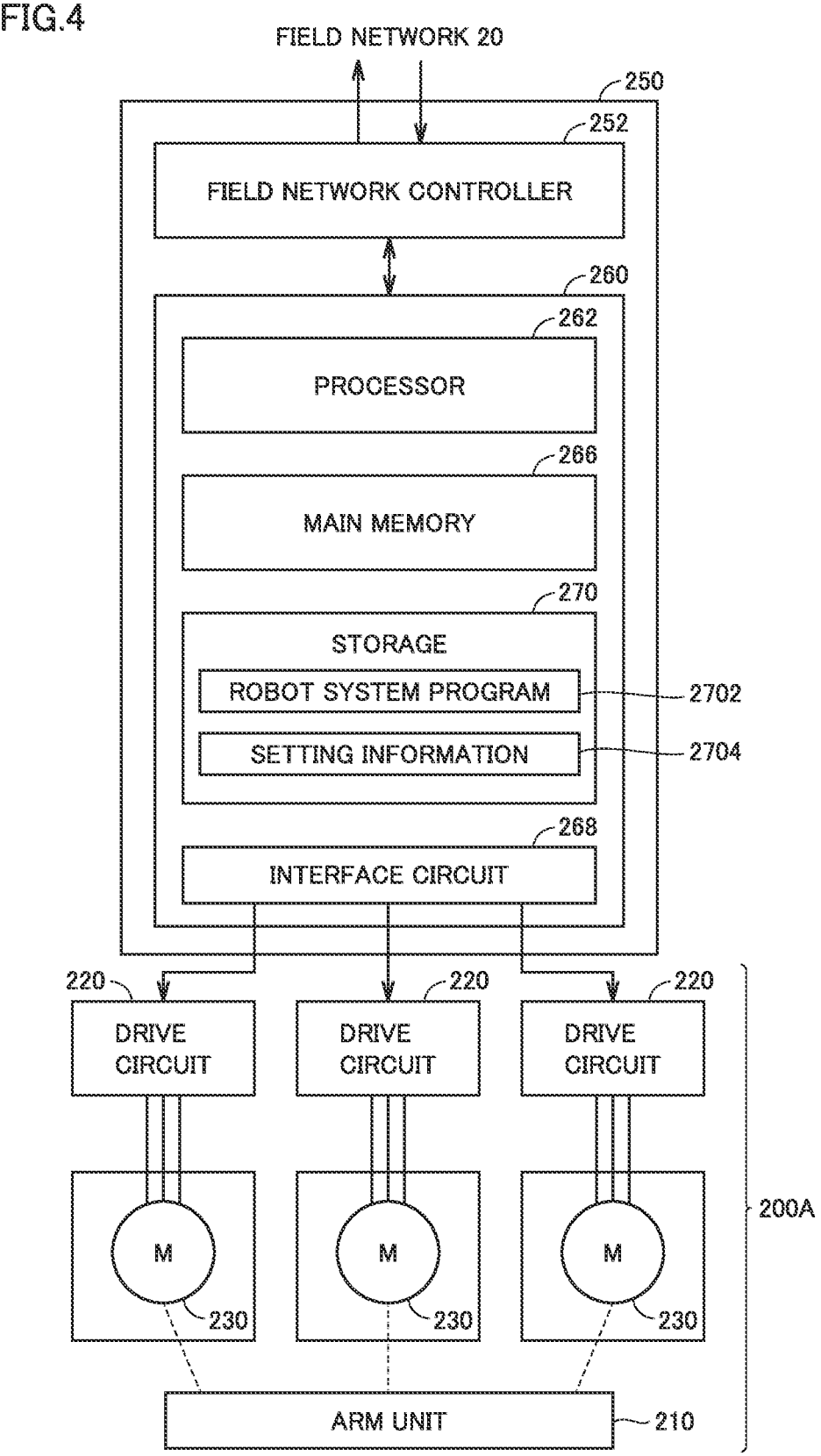
FIG. 4 is a schematic diagram illustrating a hardware configuration example of a robot constituting the robot control system of the embodiment.

FIG. 4 is a schematic diagram illustrating the hardware configuration example of robot 200 constituting robot control system 1 of the embodiment. FIG. 4 illustrates a configuration example in the case where custom robot 200A is adopted as robot 200.

Referring to FIG. 4, custom robot 200A is connected to robot controller 250. Custom robot 200A and robot controller 250 may be constituted integrally or separately.

Custom robot 200A includes a drive circuit 220 corresponding to the number of shafts or joints and a motor 230 driven by drive circuit 220. Each of drive circuits 220 includes a converter circuit, an inverter circuit, and the like, generates power of a voltage, a current, and a phase designated according to the command value from robot controller 250, and supplies the power to motor 230.

Each of motors 230 is an actuator that is mechanically coupled to any shaft or joint of an arm unit 210 constituting custom robot 200A and drives the corresponding shaft or joint by rotation of motor 230.

A motor having a characteristic corresponding to arm unit 210 to be driven can be adopted as motor 230. For example, as motor 230, any of an induction type motor, a synchronous type motor, a permanent magnet type motor, and a reluctance motor may be adopted, and not only a rotation type but also a linear motor may be adopted. Drive circuit 220 corresponding to motor 230 of a drive target is adopted.

Robot controller 250 includes field network controller 252 and a control processing circuit 260.

Field network controller 252 mainly exchanges data with control device 100 through field network 20.

Control processing circuit 260 executes arithmetic processing required for driving custom robot 200A. As an example, control processing circuit 260 includes a processor 262, a main memory 266, a storage 270, and an interface circuit 268.

Processor 262 executes a control arithmetic operation driving custom robot 200A. Main memory 266 is constituted of a volatile storage device such as a DRAM or an SRAM. For example, storage 270 includes a non-volatile storage device such as an HDD or an SSD.

Storage 270 stores a robot system program 2702 implementing the control for driving robot 200, and setting information 2704 including a setting parameter group required for the processing in robot controller 250.

Interface circuit 268 gives the command value to each drive circuit 220. Interface circuit 268 and drive circuit 220 may be electrically connected by a hard wire, or connected by a data link.

Figure 5:
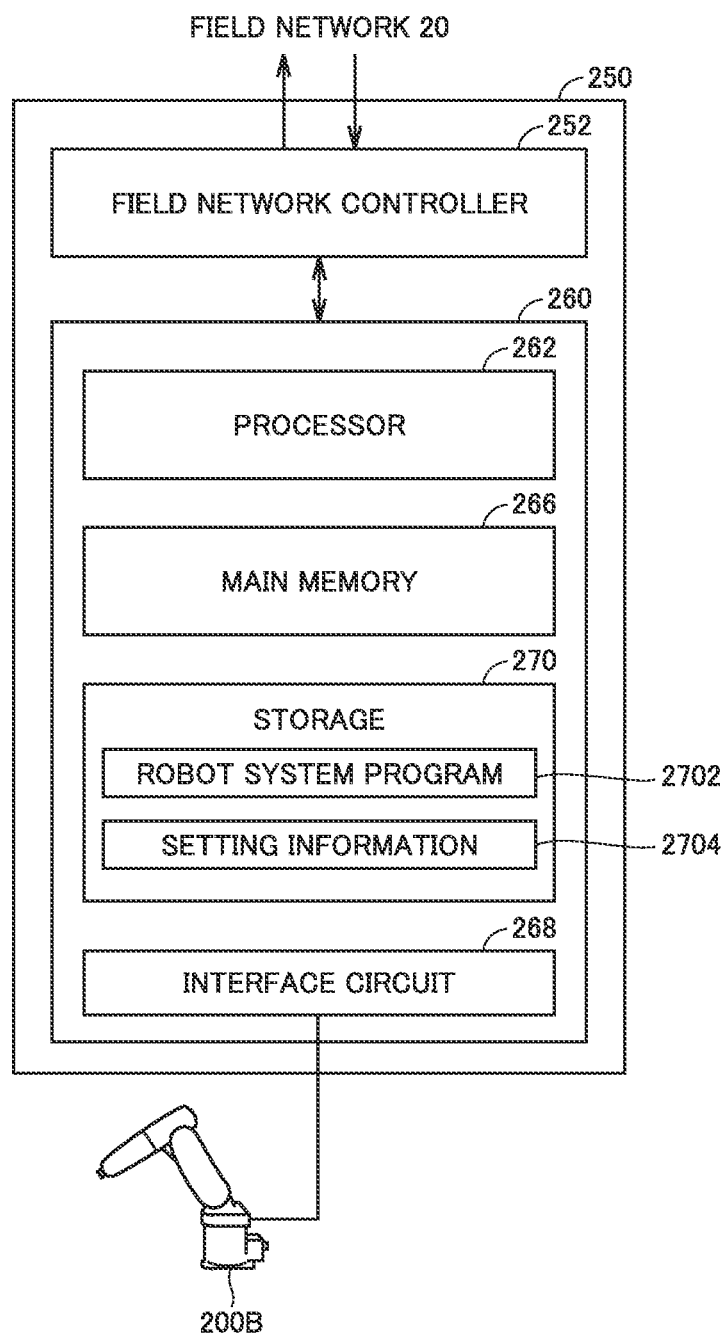
FIG. 5 is a schematic diagram illustrating another hardware configuration example of the robot constituting the robot control system of the embodiment.

FIG. 5 is a schematic diagram illustrating another hardware configuration example of robot 200 constituting robot control system 1 of the embodiment. FIG. 5 illustrates the configuration example in the case where a general-purpose robot 200B is adopted as robot 200.

Referring to FIG. 5, one or more motors and drive circuits (not illustrated) are incorporated in general-purpose robot 200B, and when a target trajectory of general-purpose robot 200B is indicated, one or more motors are driven according to the indicated target trajectory.

When custom robot 200A in FIG. 4 is driven, each command value to drive circuit 220 corresponding to the shaft or the joint is required to be given, whereas when general-purpose robot 200B in FIG. 5 is driven, only the target trajectory of general-purpose robot 200B is required to be instructed.

The function related to the control of robot 200 provided by robot controller 250 will be described later.

(c3: Operation Pendant 300)

Figure 6:
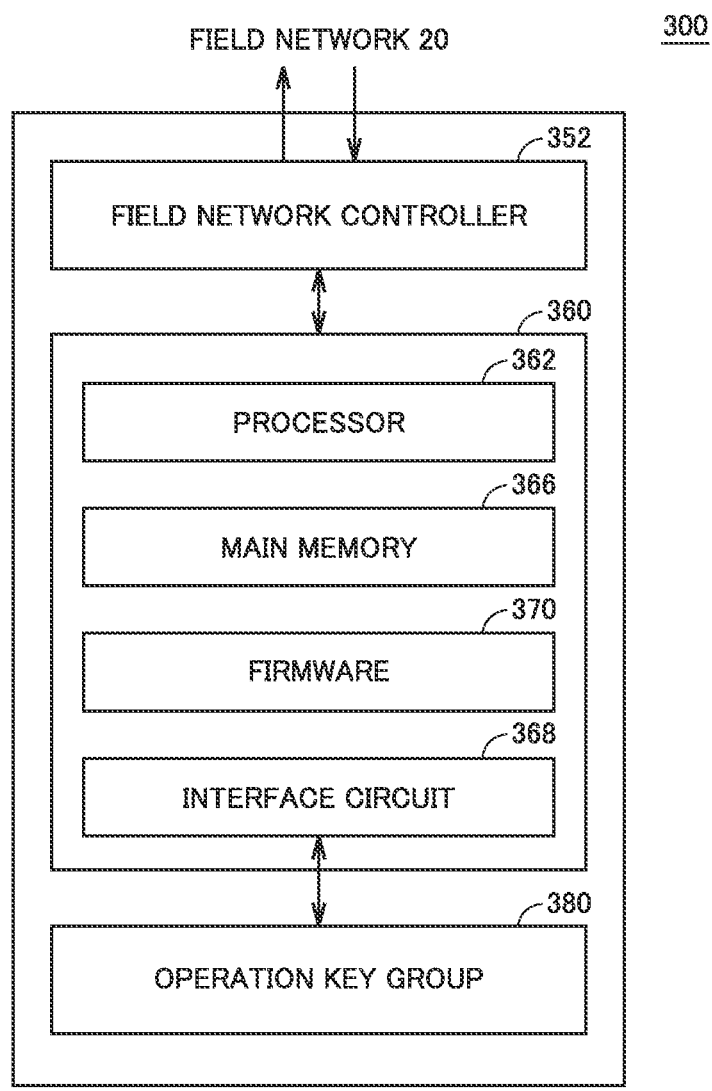
FIG. 6 is a schematic diagram illustrating a hardware configuration example of an operation pendant constituting the robot control system of the embodiment.

FIG. 6 is a schematic diagram illustrating a hardware configuration example of operation pendant 300 constituting robot control system 1 of the embodiment. Referring to FIG. 6, operation pendant 300 includes a field network controller 352, a control processing circuit 360, and an operation key group 380.

Field network controller 352 mainly exchanges the data with control device 100 through field network 20.

Control processing circuit 360 includes a processor 362, a main memory 366, firmware 370, and an interface circuit 368.

Processor 362 executes firmware 370 to implement the processing required for operation pendant 300. Main memory 366 is constituted of a volatile storage device such as a DRAM or an SRAM.

Interface circuit 368 exchanges a signal with operation key group 380.

Operation key group 380 is an input device that receives a user operation. Operation key group 380 may include an indicator indicating an input state and the like.

(c4: Support Device 400)

Figure 7:
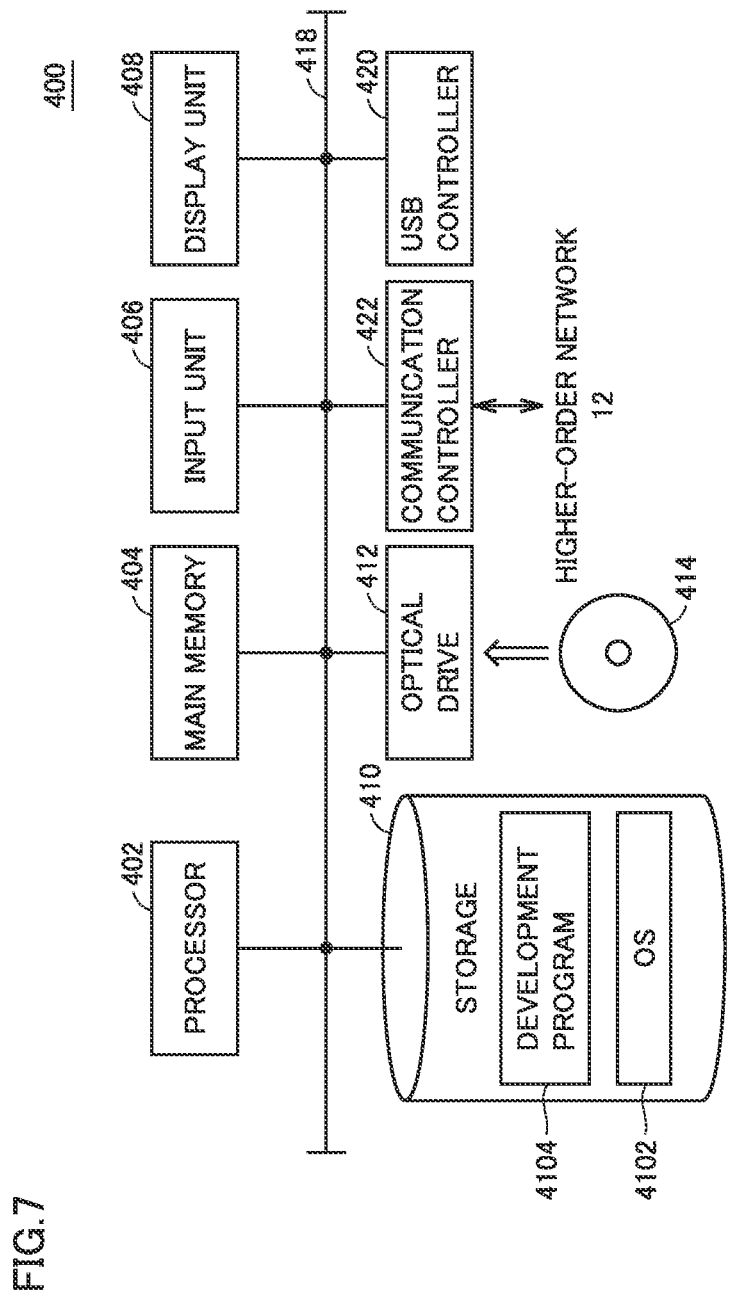
FIG. 7 is a schematic diagram illustrating a hardware configuration example of a support device constituting the robot control system of the embodiment.

FIG. 7 is a schematic diagram illustrating a hardware configuration example of support device 400 constituting robot control system 1 of the embodiment. Support device 400 is a development support device developing the program executed by control device 100, and may be implemented using, for example, a general-purpose personal computer.

As illustrated in FIG. 7, support device 400 includes a processor 402, a main memory 404, an input unit 406, an output unit 408, a storage 410, an optical drive 412, a USB controller 420, and a communication controller 422. These components are connected to each other through a processor bus 418.

Processor 402 is constructed of a CPU, a GPU, and the like, and reads a program (as an example, an OS 4102 and a development program 4104) stored in storage 410, develops the program in main memory 404, and executes the program, thereby implementing various pieces of processing required for support device 400.

Main memory 404 is configure of a volatile storage device such as a DRAM or an SRAM. For example, storage 410 includes a non-volatile storage device such as an HDD or an SSD.

Storage 410 stores OS 4102 implementing the basic function, development program 4104 implementing a development environment, and the like. A program executed by control device 100, debugging of the program, setting of the operation of control device 100, setting of the operation of the device connected to control device 100, setting of field network 20, and the like can be performed in the development environment.

Input unit 406 includes a keyboard, a mouse, and the like, and receives a user operation. Display unit 408 includes a display, various indicators, and the like, and displays processing results and the like by processor 402.

USB controller 420 exchanges the data with control device 100 and the like through the USB connection. Communication controller 422 exchanges the data with an arbitrary information processing device through higher-order network 12.

Support device 400 includes optical drive 412, and a program stored in a storage medium 414 (for example, an optical storage medium such as a digital versatile disc (DVD)) in which a computer-readable program is non-transiently stored is read and installed in storage 410 or the like.

Development program 4104 and the like executed by support device 400 may be installed through computer-readable storage medium 414, or installed by being downloaded from the server device or the like on the network. Sometimes functions provided by support device 400 of the first embodiment are implemented using a part of modules provided by OS 4102.

Support device 400 may be removed from control device 100 during the operation of robot control system 1.

(c5: Display Device 500)

Display device 500 constituting robot control system 1 of the embodiment may be implemented using a general-purpose personal computer as an example. A basic hardware configuration example of display device 500 is similar to the hardware configuration example of support device 400 in FIG. 7, so that detailed description is not made herein.

(c6: Server Device 600)

Server device 600 constituting robot control system 1 of the embodiment may be implemented using a general-purpose personal computer as an example. A basic hardware configuration example of server device 600 is similar to the hardware configuration example of support device 400 in FIG. 7, so that detailed description is not made herein.

(c7: Other Forms)

Although the configuration example in which necessary functions are provided by one or more processors executing the program has been described in FIGS. 3 to 7, some or all of these provided functions may be implemented using a dedicated hardware circuit (for example, an application specific integrated circuit (ASIC) and a field-programmable gate array (FPGA)).

A main part of control device 100 may be implemented using hardware (for example, an industrial personal computer based on a general-purpose personal computer) according to a general-purpose architecture. In this case, the plurality of OSs having different uses may be executed in parallel using a virtualization technology, and the required application may be executed on each OS. Furthermore, a configuration in which functions such as support device 400 and display device 500 are integrated with control device 100 may be adopted.

D. FUNCTIONAL CONFIGURATION EXAMPLE

An example of a functional configuration controlling robot 200 will be described.

Figure 8:
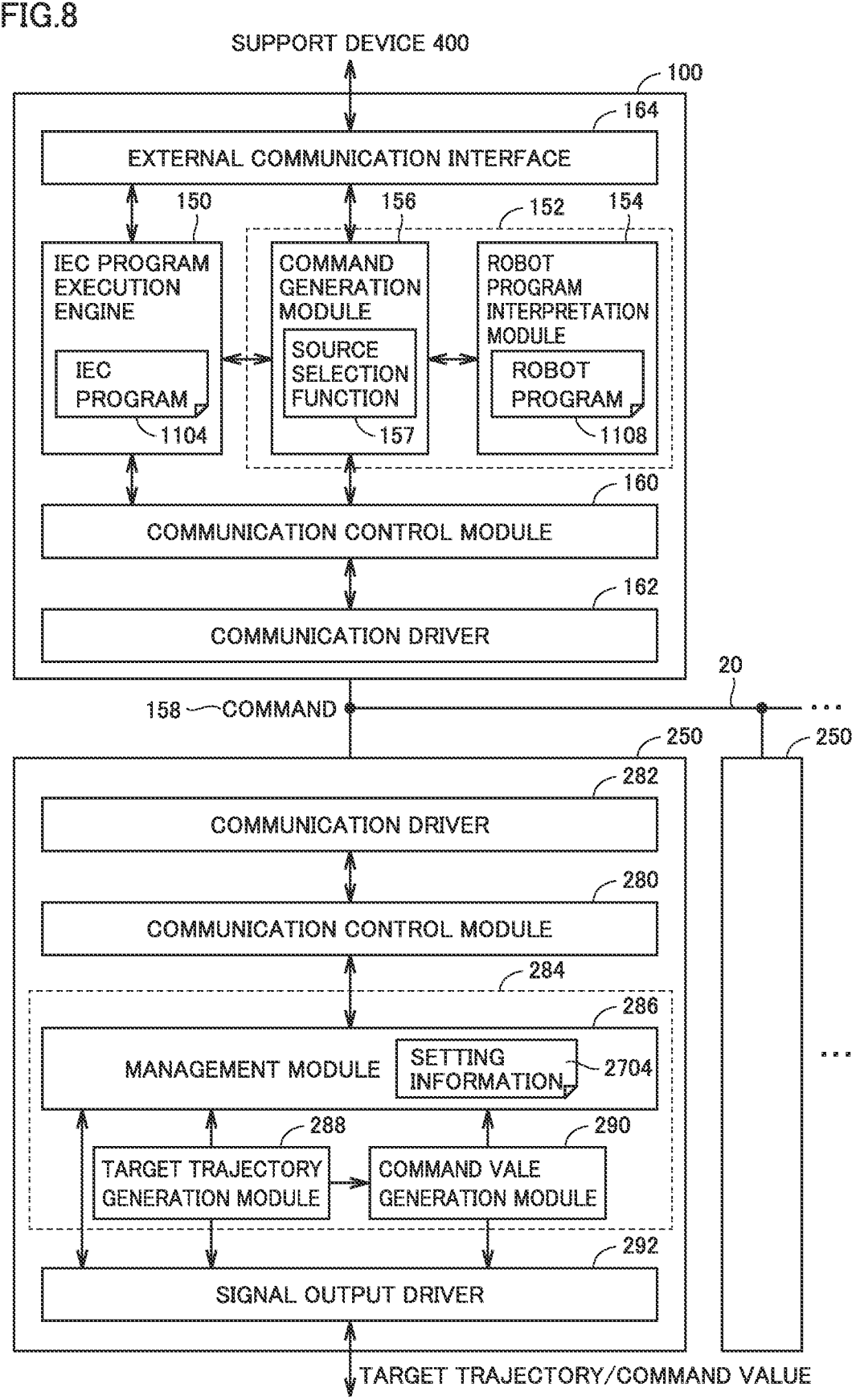
FIG. 8 is a schematic diagram illustrating an example of a functional configuration controlling behavior of the robot in the robot control system of the embodiment.

FIG. 8 is a schematic diagram illustrating an example of the functional configuration controlling the behavior of robot 200 in robot control system 1 of the embodiment. Referring to FIG. 8, a command 158 controlling robot 200 and the like are exchanged between control device 100 and one or more robot controllers 250.

Control device 100 includes an IEC program execution engine 150, a robot program execution engine 152, a communication control module 160, a communication driver 162, and an external communication interface 164. Typically, these element may be implemented by processor 102 of control device 100 executing system program 1102.

IEC program execution engine 150 periodically generates an output value given to robot controller 250 by executing IEC program 1104. More specifically, IEC program execution engine 150 cyclically executes IEC program 1104 every predetermined control period. The control period of control device 100 is typically assumed to be about several hundred μsec to several 100 msec. IEC program execution engine 150 outputs an internal command (for example, transmission start and transmission stop of command 158) to robot program execution engine 152 and/or acquires a state value (for example, the state of robot program 1108 executed by robot program execution engine 152) from robot program execution engine 152 according to the execution of IEC program 1104.

Robot program execution engine 152 executes robot program 1108 to generate command 158 instructing the behavior of robot 200. That is, robot program execution engine 152 sequentially executes robot program 1108 and transmits command 158 controlling robot 200 to one or more robot controllers 250. More specifically, robot program execution engine 152 includes a robot program interpretation module 154 and a command generation module 156.

Robot program interpretation module 154 sequentially reads and parses robot program 1108, and outputs the internal command obtained by the parsing to command generation module 156. Robot program interpretation module 154 can also interpret commands related to signal input/output, file access, and communication in addition to the commands related to the behavior of robot 200 described in the programming language included in robot program 1108.

Start, stop, and the like of reading of robot program 1108 by robot program interpretation module 154 may be controlled by command generation module 156.

Command generation module 156 generates commands 158 for each of robot controllers 250 according to the internal commands from robot program interpretation module 154. In addition to the internal commands from robot program interpretation module 154, command generation module 156 can also generate command 158 for each robot controller 250 according to the operation instruction (internal command) from operation pendant 300 and the internal command from support device 400.

In this manner, command generation module 156 can receive the internal command from the plurality of sources and generate command 158. Source selection function 157 of command generation module 156 determines from which source command generation module 156 generates command 158 according to the internal command. That is, source selection function 157 enables any one of the plurality of sources. Details of source selection function 157 will be described later.

Command generation module 156 functions as a host of one or more connected robot controllers 250. More specifically, command generation module 156 controls the start and stop of the execution of robot program 1108 in robot program interpretation module 154 and controls the start and stop of the generation of command 158 for robot controller 250 according to the internal command exchanged with IEC program execution engine 150 and/or the internal command exchanged with support device 400 through external communication interface 164.

Command generation module 156 may collect information such as the state value and the error from robot controller 250.

A configuration example in which robot program interpretation module 154 and command generation module 156 are separated is illustrated for convenience of description, but these modules may be integrally mounted without being separated.

Communication control module 160 and communication driver 162 correspond to the communication unit that transmits command 158 generated according to information from the enabled source in the plurality of sources to robot controller 250. In addition to command 158, communication control module 160 and communication driver 162 also transmit the output value from IEC program execution engine 150 to robot controller 250.

Communication control module 160 manages the data exchange with one or more connected robot controllers 250. Communication control module 160 may generate a communication instance managing the data communication for each connected robot controller 250, and manage the data communication using the generated communication instance.

Communication driver 162 is an internal interface that uses field network controller 108 (see FIG. 3) to perform the data communication with one or more connected robot controllers 250.

Each of robot controllers 250 includes a communication control module 280, a communication driver 282, a robot drive engine 284, and a signal output driver 292. Typically, these elements may be implemented by processor 262 (control processing circuit 260) of robot controller 250 executing robot system program 2702.

Communication control module 280 manages the data exchange with connected control device 100. Communication control module 280 may generate the communication instance managing the data communication with connected control device 100, and manage the data communication using the generated communication instance.

Communication driver 282 is an internal interface that uses field network controller 252 (see FIG. 4) to perform the data communication with connected control device 100.

Communication control module 280 and communication driver 282 correspond to a communication unit that receives command 158 transmitted from control device 100.

According to command 158 from control device 100, robot drive engine 284 refers to setting information 2704 transmitted previously from control device 100, and executes processing for driving robot 200 (including custom robot 200A and/or general-purpose robot 200B) of the control target. More specifically, robot drive engine 284 includes a management module 286, a target trajectory generation module 288, and a command value generation module 290.

Management module 286 corresponds to a processing execution unit that executes the processing according to the output value from control device 100. More specifically, management module 286 manages the control mode, start/end of the generation of the target orbit from command 158, and the like according to the output value from control device 100.

Target trajectory generation module 288 (target trajectory generation unit) generates a target trajectory of robot 200 (including custom robot 200A and/or general-purpose robot 200B) of the control target according to command 158 from control device 100. Typically the generated target trajectory includes an hourly position of the distal end of robot 200 (the change in the position with respect to the time) and/or an hourly velocity of the distal end of robot 200 (the change in the velocity with respect to the time).

Target trajectory generation module 288 may output the generated target trajectory to command value generation module 290 (typically, the case of driving custom robot 200A in FIG. 4) or directly output the target trajectory to robot 200 through signal output driver 292 (typically, the case of driving general-purpose robot 200B in FIG. 5).

Command value generation module 290 sequentially generates the command value for driving each axis of robot 200 so as to provide the behavior instructed by command 158 from control device 100. More specifically, command value generation module 290 sequentially generates the command value for respective motors 230 constituting robot 200 of the control target according to the target trajectory generated by target trajectory generation module 288. Command value generation module 290 may update the command value every predetermined control period or every predetermined event.

The control period of target trajectory generation module 288 of robot controller 250 is typically assumed to be about several hundred μsec to about several 100 msec, which is about the same as the control period of control device 100. On the other hand, it is assumed that the control period of command value generation module 290 of robot controller 250 is faster than the control cycle of target trajectory generation module 288 (for example, about several to several 10 times).

More specifically, command value generation module 290 calculates each command value given to motor 230 driving robot 200 along the target trajectory based on kinematics of robot 200 of the control target. Command value generation module 290 calculates a target position (the change in the position/angle with respect to the time), a target speed (the change in the speed/angular velocity with respect to the time), a target acceleration (the change in acceleration/angular acceleration with respect to the time), and/or a target acceleration (the change in jerk/angular acceleration with respect to the time) as the command value given to motor 230.

Robot drive engine 284 may acquire a parameter required for calculating the target orbit and/or the command value with reference to setting information 2704 (see FIG. 4).

A configuration example in which target trajectory generation module 288 and command value generation module 290 are separated is illustrated for convenience of description, but these modules may be integrally mounted without being separated.

Signal output driver 292 is an internal interface outputting the command value and/or the target orbit to one or more connected drive circuits 220 and/or robot 200 using interface circuit 268 (see FIG. 4).

E. PROCESSING EXECUTED BY CONTROL DEVICE 100

As described above, robot program 1108 is the program controlling the behavior of robot 200. However, for example, timing to start/stop the operation of robot 200, a condition for operating robot 200 (for example, cooperation with the facility in a preceding process or a subsequent process), and a safety condition related to robot 200 are required to be controlled in order to control the behavior of robot 200.

Accordingly, in the control device 100, not only robot program 1108 but also IEC program 1104 may be executed in parallel. IEC program 1104 may include logic or the like that collects the state value related to the operation of robot 200 to determine the timing to start/stop the operation of robot 200.

Figures 9A, 9B:
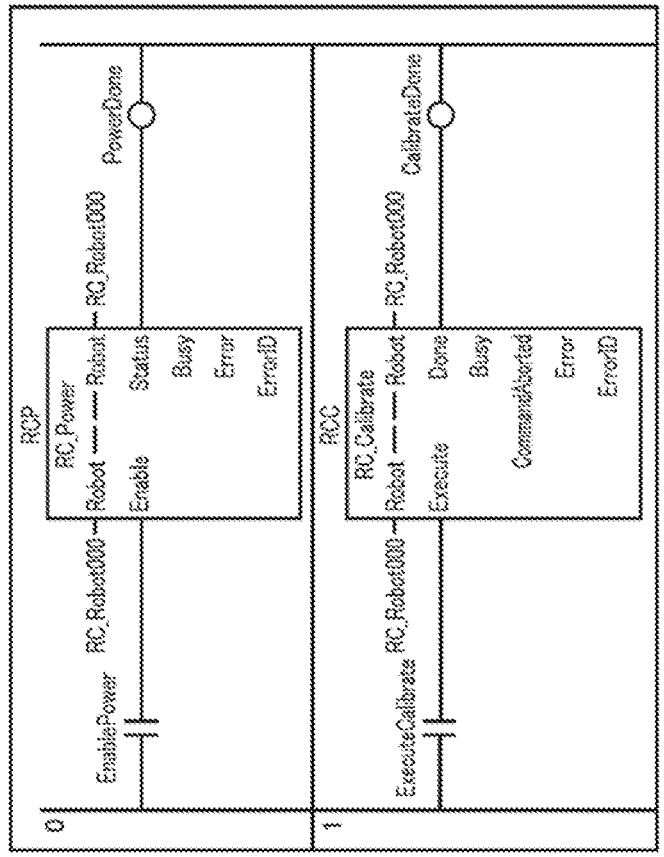
FIGS. 9A and 9B are views illustrating an example of an IEC program and a robot program executed by the control device constituting the robot control system according to the present embodiment.

FIGS. 9A and 9B are views illustrating an example of IEC program 1104 and robot program 1108 executed by control device 100 constituting robot control system 1 according to the present embodiment.

FIG. 9(A) illustrates an example of IEC program 1104 described in a ladder diagram (LD language). The example of IEC program 1104 in FIG. 9(A) includes a command related to processing for turning on the power of control target robot 200 and processing for executing calibration of control target robot 200.

As illustrated in FIG. 9(A), IEC program 1104 may include a function block as an element. Furthermore, IEC program 1104 may include a code described in structured text (ST language).

FIG. 9(B) illustrates an example of robot program 1108 described in V+ language. As illustrated in FIG. 9(B), the V+ language is a kind of high-level language controlling the behavior of robot 200.

Parallel execution of IEC program 1104 and robot program 1108 in control device 100 will be described below.

Figure 10:
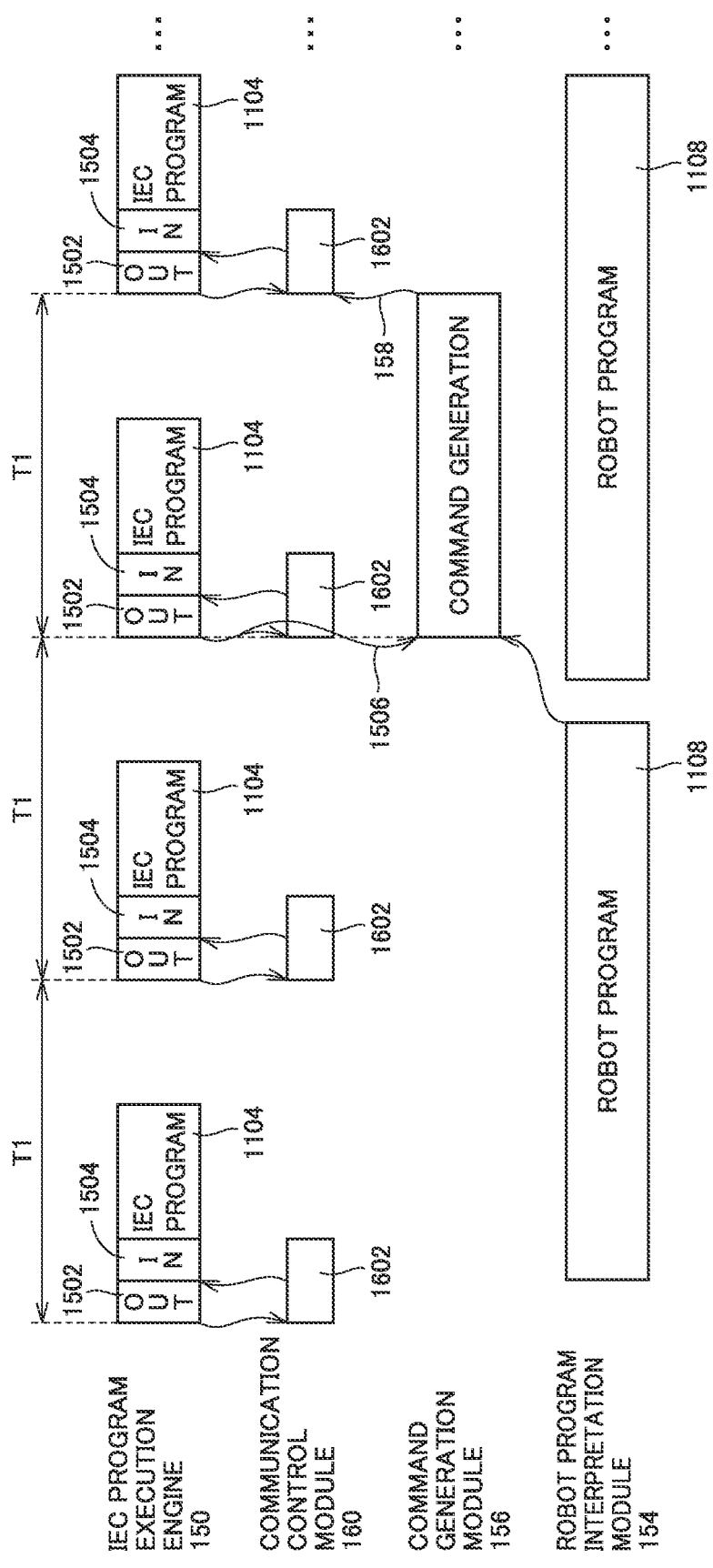
FIG. 10 is a time chart illustrating an execution example of a program in the control device constituting the robot control system according to the present embodiment.

FIG. 10 is a time chart illustrating an execution example of a program in control device 100 constituting robot control system 1 according to the present embodiment. As illustrated in FIG. 10, in control device 100, IEC program execution engine 150 and robot program execution engine 152 (robot program interpretation module 154 and command generation module 156) independently execute the processing.

IEC program execution engine 150 cyclically executes (repeatedly executes) IEC program 1104 every predetermined control period T1. The cyclic execution of IEC program 1104 includes output update processing 1502 and input update processing 1504.

Output update processing 1502 includes processing for reflecting the output value determined by the execution of IEC program 1104 on the internal variable and/or the target device. In particular, the output value for a device connected through field network 20 is stored in a communication frame and transmitted onto field network 20.

Input update processing 1504 includes processing for acquiring the input value (state value) necessary for the execution of IEC program 1104 from the internal variable and/or the target device. In particular, the input value from the device connected through field network 20 are obtained from the communication frame propagating on field network 20.

Communication control module 160 sends the communication frame onto field network 20 in synchronization with control period T1, and receives the communication frame circulating on field network 20 and returning. Communication control module 160 stores the output value generated by IEC program execution engine 150 and/or command 158 generated by command generation module 156 in the communication frame, and holds the input value (state value) included in the returned communication frame such that IEC program execution engine 150 and command generation module 156 can refer to the input value.

Command generation module 156 generates command 158 according to the internal command from robot program interpretation module 154. Typically, the timing at which command generation module 156 generates command 158 is determined by the output value from IEC program execution engine 150. The example in FIG. 10 illustrates an example in which command generation module 156 generates command 158 in response to the output value from IEC program execution engine 150. The generation of command 158 by command generation module 156 may be synchronized with the timing of output update processing 1502 of IEC program execution engine 150.

Robot program interpretation module 154 typically executes robot program 1108 independently of control period T1. The start/stop of the execution of robot program 1108 by robot program interpretation module 154 may be controlled by command generation module 156.

As illustrated in FIG. 10, robot program execution engine 152 sequentially executes robot program 1108. IEC program execution engine 150 cyclically executes IEC program 1108 independently of the execution of robot program 1104 by robot program execution engine 152.

F. SOURCE SELECTION FUNCTION

A specific example of source selection function 157 will be described below.

Figure 11:
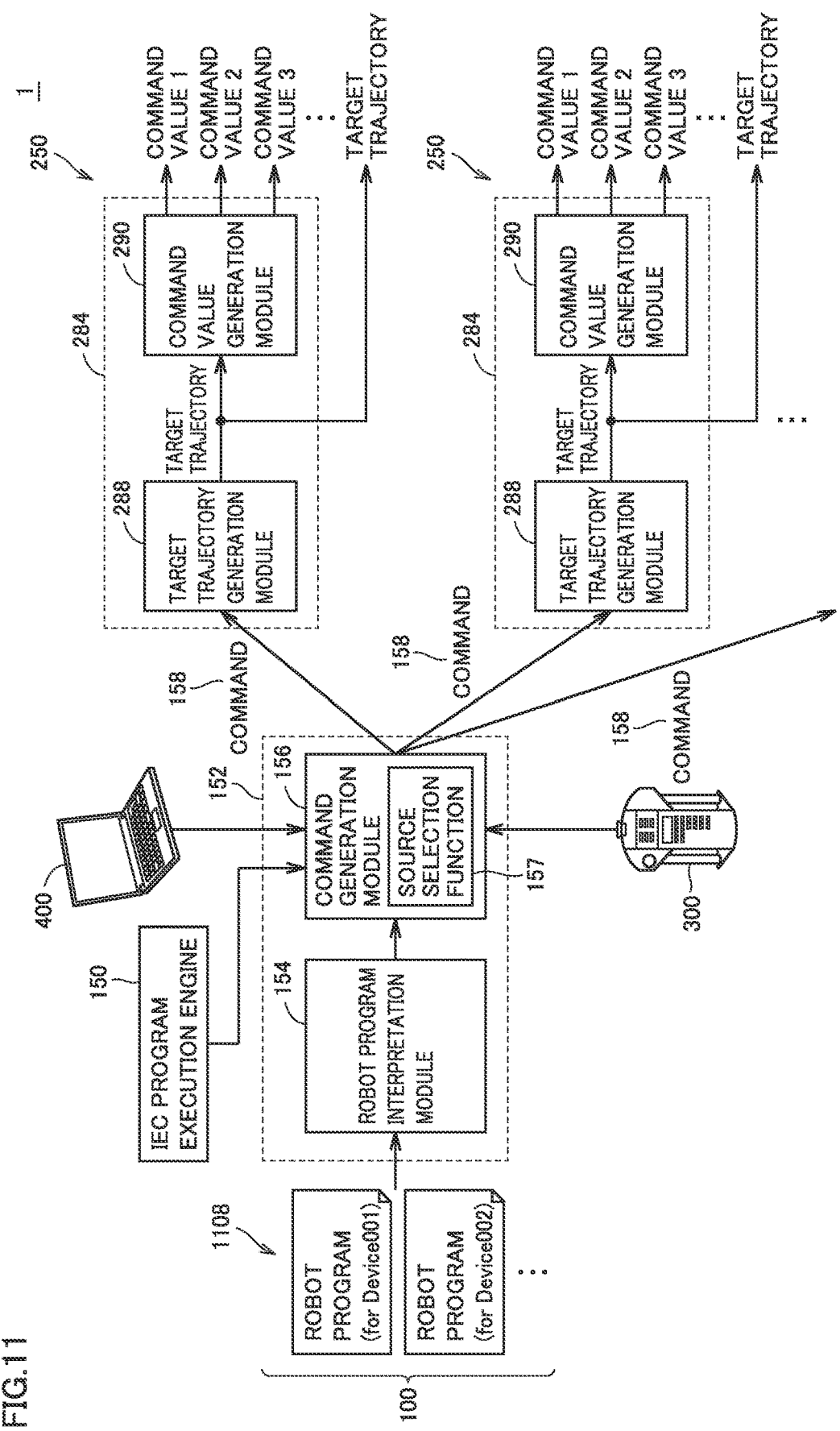
FIG. 11 is a schematic diagram schematically illustrating data processing including a source selection function in the robot control system according to the present embodiment.

FIG. 11 is a schematic diagram schematically illustrating data processing including source selection function 157 in robot control system 1 according to the present embodiment. Referring to FIG. 11, robot program 1108 written in a predetermined programming language, the operation instruction (internal command) from operation pendant 300, and the internal commands from support device 400 and IEC program execution engine 150 are input to robot program execution engine 152 of control device 100.

Source selection function 157 of command generation module 156 selects from which source in the plurality of sources command 158 is generated.

(1) When Robot Program 1108 is Selected as the Source

When robot program 1108 is selected as the source, robot program 1108 is first input to robot program interpretation module 154. Then, robot program interpretation module 154 interprets robot program 1108 and generates the internal command.

Furthermore, command generation module 156 generates command 158 from the generated internal command.

That is, when command 158 is generated according to robot program 1108, robot program interpretation module 154 (program interpretation unit) that sequentially executes robot program 1108 serves as the source.

For example, in a production facility in which the plurality of robots 200 are disposed in the same production line and each robot 200 performs different work, different robot program 1108 is input to robot program execution engine 152 for each robot 200. In addition, in a production facility in which the plurality of the same production lines are disposed in parallel, and robots 200 that perform the same work are disposed in the respective production lines, common robot program 1108 may be input to robot program execution engine 152. However, generated commands 158 may be independently transmitted to robot controller 250.

Furthermore, the plurality of robot programs 1108 described in different programming languages (for example, V+ language and G code) may be input to robot program execution engine 152. Robot program execution engine 152 can generate command 158 described according to a common command system even when robot program 1108 described in a different programming language is input. As described above, robot program execution engine 152 may be constituted of being able to interpret a plurality of programming languages, and may generate command 158 according to a predetermined command system without depending on the programming language.

(2) When Operating Pendant 300 is Selected as Source

When operation pendant 300 is selected as the source, the operation instruction corresponding to a user operation on operation pendant 300 is input to control device 100 through field network 20. Then, the operation instruction received from operation pendant 300 is provided to command generation module 156 as the internal command. Command generation module 156 generates command 158 according to the operation instruction from operation pendant 300.

That is, when command 158 is generated according to the operation instruction from operation pendant 300, operation pendant 300 (operation unit) that is network-connected to control device 100 to generate the operation instruction according to the user operation serves as the source.

Typically, operation pendant 300 is used for performing an operation (teaching operation) determining the behavior of robot 200 or the like. Therefore, for example, operation pendant 300 outputs the operation instruction moving the distal end of robot 200 in any direction. Command generation module 156 generates command 158 in order to move the distal end of robot 200 in the designated direction according to the operation instruction from operation pendant 300.

(3) When Support Device 400 is Selected as Source

When support device 400 is selected as the source, the internal command generated by support device 400 is input to command generation module 156. Command generation module 156 generates command 158 according to the internal command from support device 400. The generation of the internal command by support device 400 may be implemented by processor 402 of support device 400 executing development program 4104, or the internal command may be generated by the user explicitly operating development program 4104.

That is, when command 158 is generated according to the internal command from support device 400, support device 400 (development support device) that is connected to control device 100 to provide information according to the user operation or the program execution becomes the source.

(4) When IEC Program Execution Engine 150 is Selected as Source

When IEC program execution engine 150 is selected as the source, the output value determined by IEC program execution engine 150 executing IEC program 1104 is input to command generation module 156 as the internal command. For example, when a certain condition is satisfied, the output value stopping robot 200 may be input to command generation module 156, and command 158 corresponding to the output value may be output to robot controller 250.

As described above, source selection function 157 enables the source generating command 158 in the plurality of sources. The source from which command 158 is generated is not limited to the above-described four sources, but for example, IEC program 1104 (or IEC program execution engine 150) that directly outputs the directly-output internal command may be used as the source. Furthermore, when a plurality of operation pendants 300 or a plurality of support devices 400 exist, the operation pendant 300 or the support device 400 can be the independent source. The external device is not limited to the support device 400, but any information processing device such as a human machine interface (HMI) may be adopted.

Command 158 may be generated for one or more connected robot controllers 250.

Generated command 158 is transmitted to corresponding robot controller 250 through field network 20 (see FIG. 2). When control device 100 is network-connected to the plurality of robot controllers 250, command 158 is transmitted to each of the plurality of robot controllers 250.

Target trajectory generation module 288 of robot controller 250 generates the target trajectory according to command 158 from control device 100. The generated target trajectory may be output as it is to general-purpose robot 200B. That is, robot controller 250 may externally output the target trajectory.

On the other hand, command value generation module 290 of robot controller 250 generates the command value for each motor 230 constituting robot 200 of the control target according to the generated target trajectory.

Any command system can be adopted as the command system that defines command 158. From the viewpoint of reducing the processing related to the generation of command 158, it is preferable to adopt a command group that can be easily generated from the command described in robot program 1108.

G. IMPLEMENTATION EXAMPLE AND APPLICATION EXAMPLE OF SOURCE SELECTION FUNCTION

An implementation example and an application example of source selection function 157 will be described below.

Figure 12:
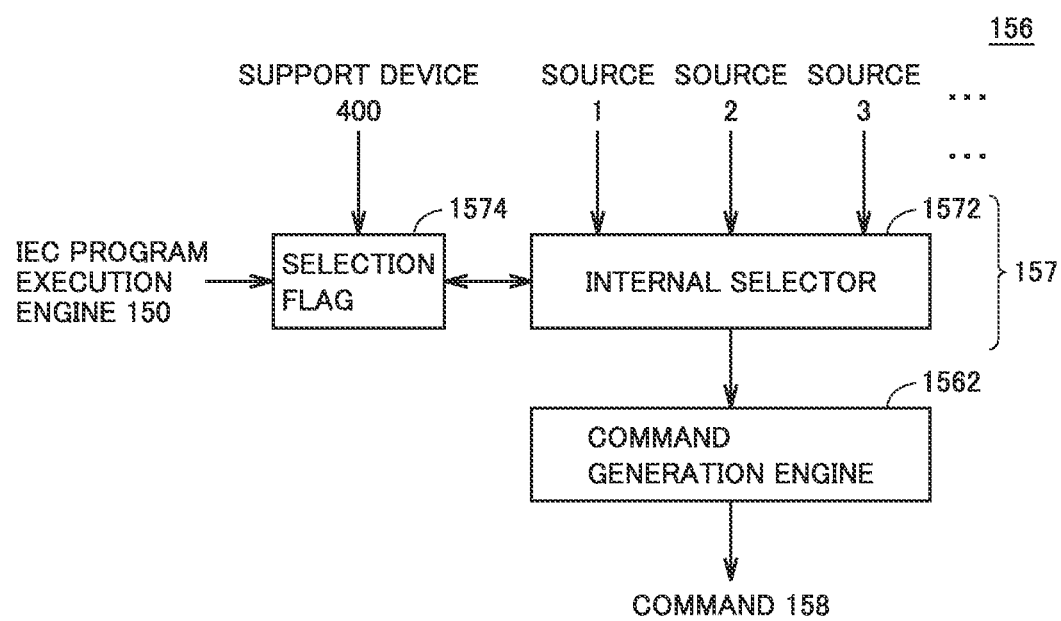
FIG. 12 is a schematic diagram illustrating an implementation example of the source selection function in the robot control system according to the present embodiment.

FIG. 12 is a schematic diagram illustrating the implementation example of source selection function 157 in robot control system 1 according to the present embodiment. Referring to FIG. 12, source selection function 157 included in command generation module 156 includes an internal selector 1572 and a selection flag 1574.

Internal selector 1572 selects and outputs one source corresponding to the value of selection flag 1574 in the plurality of input sources.

The value of selection flag 1574 can be updated according to the command from IEC program execution engine 150 and/or support device 400. The source selected by internal selector 1572 is connected to command generation engine 1562 that is an actual state that generates command 158. Command generation engine 1562 generates command 158 according to the internal command from the selected source or the like.

In this manner, the source to be enabled may be selected or determined from the plurality of sources by the command from IEC program execution engine 150 and/or support device 400. In particular, when the command from support device 400 is used, source selection function 157 of command generation module 156 enables the specific source according to the command given from the outside to control device 100.

Alternatively, source selection function 157 of command generation module 156 may determine the source to be enabled according to a predetermined setting. In this case, for example, priorities such as operation pendant 300>support device 400>IEC program execution engine 150>robot program 1108 are previously determined, and the source with the highest priority may be enabled when the internal command or the like is input from the plurality of sources.

For example, when the operation by operation pendant 300 is prioritized, even in the state where command 158 is generated by the execution of robot program 1108, the operation of operation pendant 300 is prioritized by the user operating operation pendant 300. Such the processing according to the priority order is suitable for robot 200 or the like that requires frequent user intervention.

As described above, generation characteristic of the command value for driving each axis of robot 200 may be differed according to which source is enabled by source selection function 157 of command generation module 156.

For example, when the information such as the internal command is provided from each of the plurality of sources, the source to be enabled may be determined according to the predetermined priority order. For example, when the operation instruction from operation pendant 300 and the internal command from robot program execution engine 152 conflict with each other in the state where the priority order is set as described above, the operation instruction from operation pendant 300 is prioritized.

As such, the predetermined setting may include the priority for the source. Source selection function 157 may enable the source having the higher priority when the information is provided from each of the plurality of sources. According to this configuration, the source that is the generation source of the command can be automatically determined according to the priority order.

Figure 13:
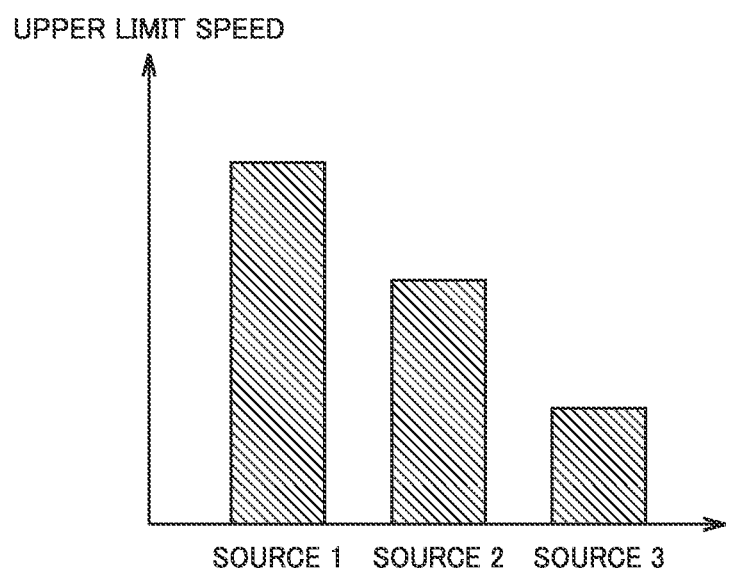
FIG. 13 is a view illustrating an example in which a generation characteristic of a command value is made different in the robot control system according to the present embodiment.

FIG. 13 is a view illustrating an example in which the generation characteristic of the command value is made different in robot control system 1 according to the present embodiment. Referring to FIG. 13, the allowable upper limit speed may be different for each source. A corresponding upper limit speed may be applied depending on the enabled source.

Figure 14:
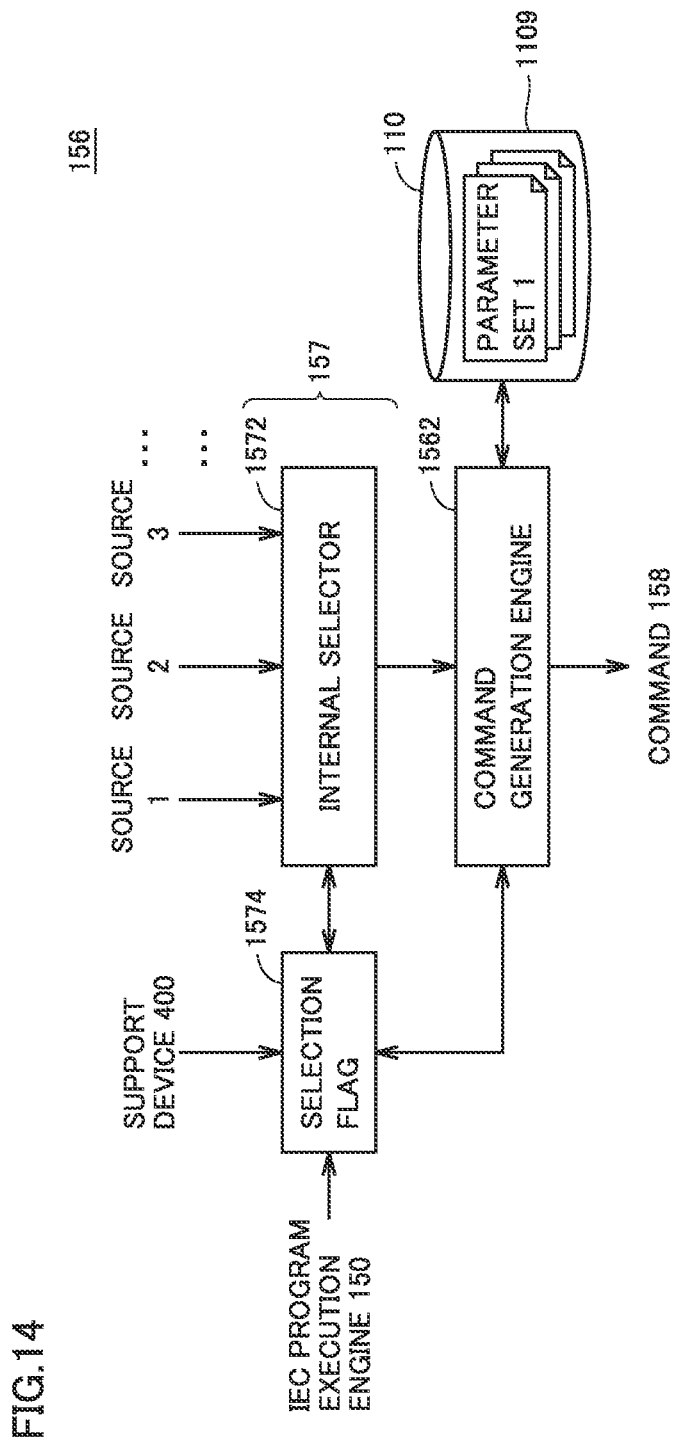
FIG. 14 is a schematic diagram illustrating a configuration example in which the generation characteristic of the command value is made different in the control device of the robot control system according to the present embodiment.

FIG. 14 is a schematic diagram illustrating a configuration example in which the generation characteristic of the command value is made different in control device 100 of robot control system 1 according to the present embodiment. Referring to FIG. 14, storage 110 of control device 100 includes a parameter set for each source corresponding to the generation characteristic of the command value as illustrated in FIG. 13 as setting information 1109.

Command generation engine 1562 included in command generation module 156 refers to the value of selection flag 1574 to select the parameter set corresponding to selection flag 1574. Command generation engine 1562 refers to the selected parameter to generate command 158 from the internal command from the enabled source.

Generated command 158 corresponds to the selected parameter. For example, generated command 158 includes the instruction such as the upper speed limit defined in the corresponding parameter.

As described above, when the source to be enabled is selected by the instruction from IEC program execution engine 150 and/or support device 400, command 158 corresponding to the selected source is generated. The generation characteristic of the command value output from robot controller 250 can be made different according to the source by generating command 158 having different characteristic according to the selected source.

Figure 15:
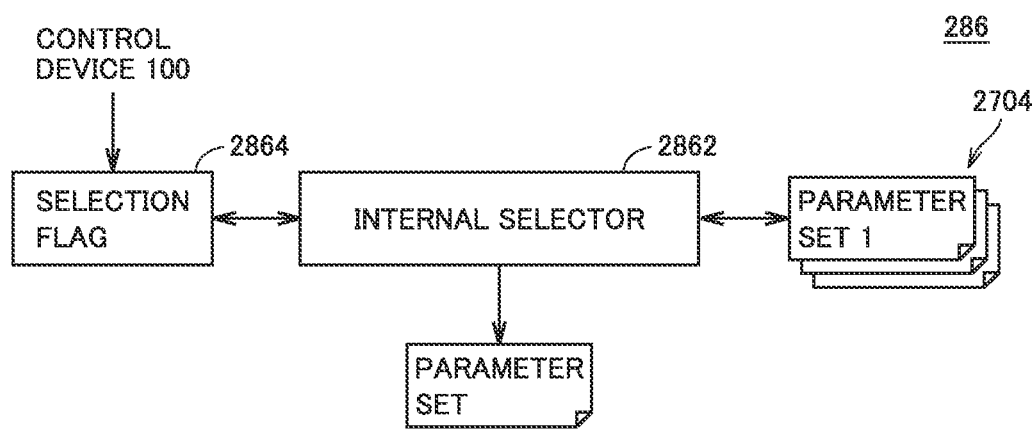
FIG. 15 is a schematic diagram illustrating another configuration example in which the generation characteristic of the command value is made different in the control device of the robot control system according to the present embodiment.

FIG. 15 is a schematic diagram illustrating another configuration example in which the generation characteristic of the command value is varied in control device 100 of robot control system 1 according to the present embodiment. Referring to FIG. 15, management module 286 of control device 100 includes a selection flag 2864.

The value of selection flag 1574 included in command generation module 156 (control device 100) is notified to robot controller 250, and the notified value is reflected in selection flag 2864. The value of selection flag 1574 is notified from control device 100 to robot controller 250 through field network 20. In this manner, the value of selection flag 1574 of control device 100 is reflected in selection flag 2864 of robot controller 250. That is, communication unit 50 of control device 100 notifies robot controller 250 which source is enabled by source selection function 157.

Management module 286 of robot controller 250 includes a parameter set for each source corresponding to the generation characteristic of the command value as illustrated in FIG. 13 as setting information 2704. Management module 286 selects the parameter set corresponding to the value of selection flag 2864 from among the parameter sets for each source. Target trajectory generation module 288 and/or command value generation module 290 (see FIG. 8) refers to the selected parameter set to execute the processing.

As described above, when the value of selection flag 1574 of control device 100 is updated by the instruction from IEC program execution engine 150 and/or support device 400, the updated value is reflected in selection flag 2864. The parameter set corresponding to selection flag 2864 is selected and referred to, so that the generation characteristic of the command value output from robot controller 250 can be made different according to the source.

H. PROCESSING PROCEDURE

A processing procedure in robot control system 1 according to the present embodiment will be described below.

(h1: Control Device 100)

In control device 100, the processing by IEC program execution engine 150 and the processing by robot program execution engine 152 (robot program interpretation module 154 and command generation module 156) are executed in parallel.

Figure 16:
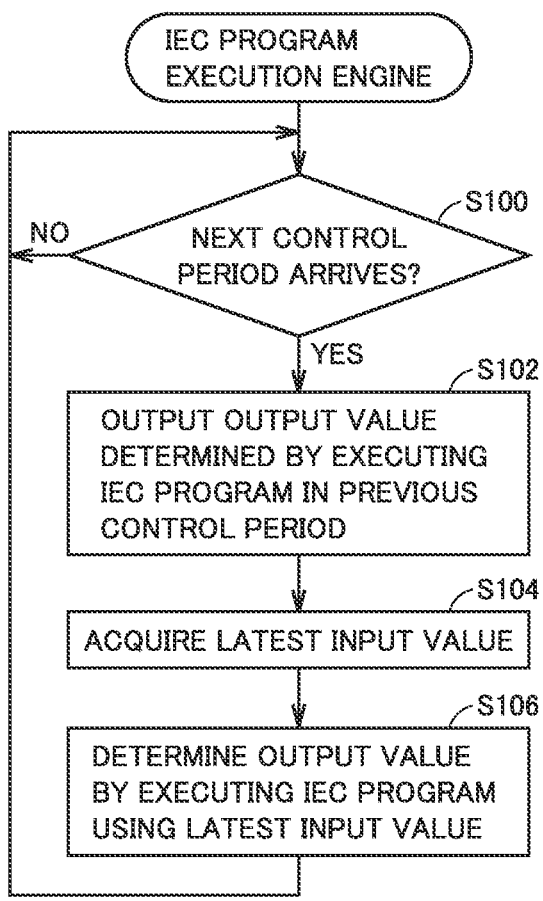
FIG. 16 is a flowchart illustrating a processing procedure by an IEC program execution engine of the control device constituting the robot control system according to the present embodiment.

FIG. 16 is a flowchart illustrating the processing procedure by IEC program execution engine 150 of control device 100 constituting robot control system 1 according to the present embodiment. Typically, each step in FIG. 16 is implemented by processor 102 of control device 100 executing system program 1102.

As the processing related to IEC program execution engine 150, control device 100 determines whether a next control period arrives (step S100). When the next control period does not arrive (NO in step S100), control device 100 waits for the processing until the next control period arrives.

When the next control period arrived (YES in step S100), control device 100 outputs the output value determined by the execution of IEC program 1104 in the previous control period (step S102). The processing for outputting the output value includes processing for updating the value of selection flag 1574 (see FIG. 12) of robot program execution engine 152.

Subsequently, control device 100 acquires the latest input value (step S104), and determines the output value by executing IEC program 1104 using the acquired latest input value (step S106). Then, the pieces of processing from step S100 are repeated.

Figure 17:
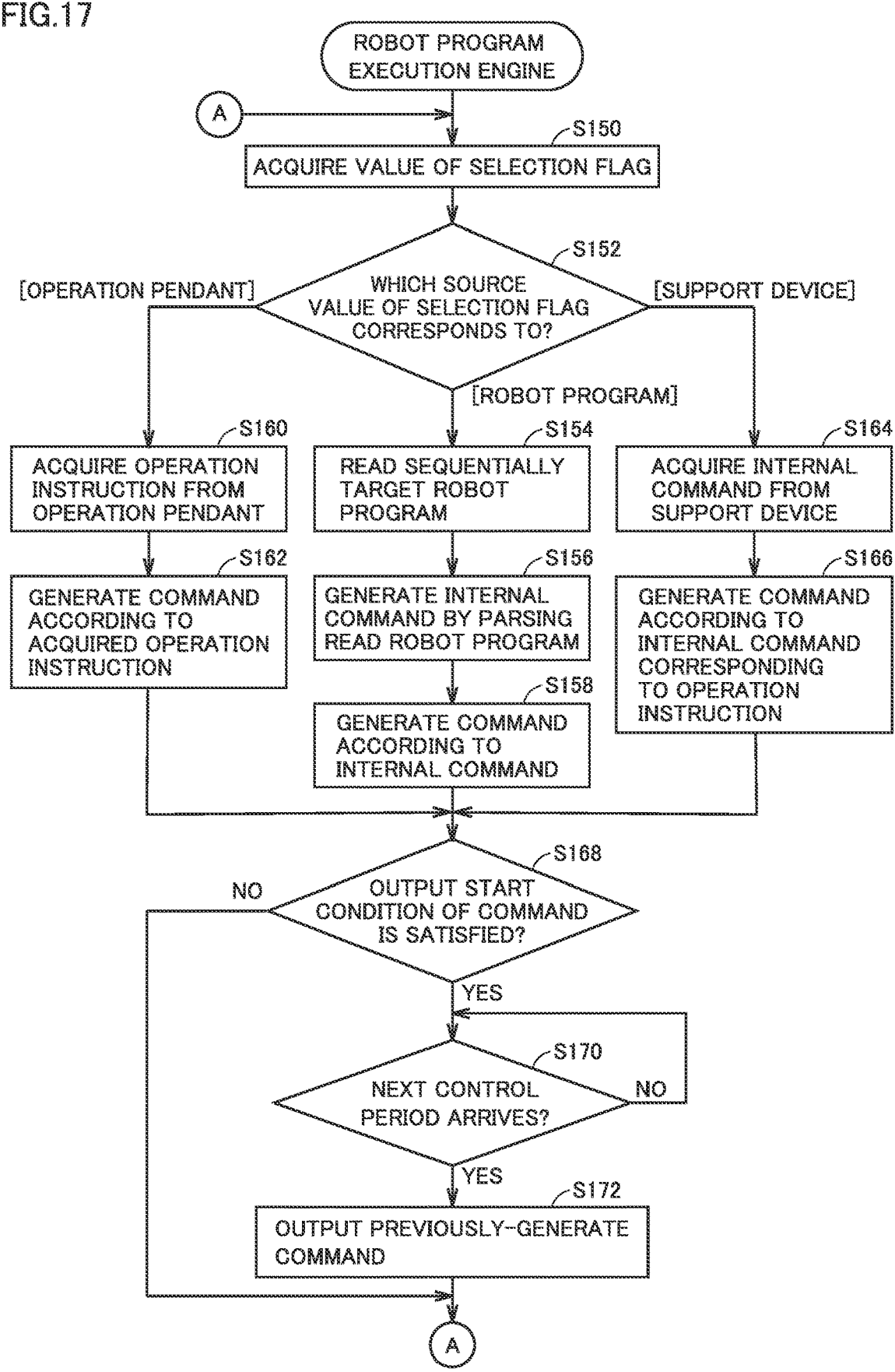
FIG. 17 is a flowchart illustrating a processing procedure by a robot program execution engine of the control device constituting the robot control system according to the present embodiment.

FIG. 17 is a flowchart illustrating the processing procedure by robot program execution engine 152 of control device 100 constituting robot control system 1 according to the present embodiment. Typically, each step in FIG. 17 is implemented by processor 102 of control device 100 executing system program 1102.

As the processing related to robot program execution engine 152, control device 100 acquires the value of selection flag 1574 (step S150). The value of selection flag 1574 may be updated by IEC program execution engine 150 or may be updated by the instruction from the external device such as support device 400.

Control device 100 determines to which source the value of selection flag 1574 corresponds (step S152). That is, control device 100 enables any one of the plurality of sources that provides the information about the generation of command 158.

When selection flag 1574 indicates the value corresponding to robot program 1108 ("robot program" in step S152), control device 100 sequentially reads target robot program 1108 (step S154), and parses read robot program 1108 to generate the internal command (step S156). Furthermore, control device 100 generates command 158 according to the generated internal command (step S158).

When selection flag 1574 indicates the value corresponding to operation pendant 300 ("operation pendant" in step S152), control device 100 acquires the operation instruction (internal command) from operation pendant 300 (step S160), and generates command 158 according to the acquired operation instruction (step S162).

When selection flag 1574 indicates the value corresponding to support device 400 ("support device" in step S152), control device 100 acquires the internal command from support device 400 (step S164), and generates command 158 according to the internal command corresponding to the acquired operation instruction (step S166).

Control device 100 determines whether the output start condition of command 158 is satisfied (step S168). The output start condition of command 158 may be defined by appropriately combining the output value from IEC program execution engine 150, the input value from robot controller 250, the instruction from support device 400, and another arbitrary information.

When the output start condition of command 158 is satisfied (YES in step S168), control device 100 determines whether the next control period arrives (step S170). When the next control period does not arrive (NO in step S170), control device 100 waits for the processing until the next control period arrives.

When the next control cycle arrives (YES in step S170), control device 100 outputs previously-generated command 158 (step S172).

When the output start condition of command 158 is not satisfied (NO in step S168), control device 100 skips the pieces of processing of steps S170 and S172.

Then, the pieces of processing from step S150 are repeated.

FIG. 18 is a flowchart illustrating the processing procedure in robot controller 250 constituting robot control system 1 according to the present embodiment. Each step illustrated in FIG. 18 may be implemented by processor 262 (control processing circuit 260) of robot controller 250 executing robot system program 2702.

As illustrated in FIG. 18, in robot controller 250, the processing by target trajectory generation module 288 and the processing by command value generation module 290 are executed in parallel.

As the processing related to target trajectory generation module 288, robot controller 250 determines whether command 158 is received from control device 100 (step S200). That is, robot controller 250 executes the processing for receiving command 158 transmitted from control device 100.

When command 158 is not received from control device 100 (NO in step S200), robot controller 250 repeats the processing of step S200.

When command 158 is received from control device 100 (YES in step S200), robot controller 250 determines whether all of commands 158 are received (step S202). When only a part of command 158 is received (NO in step S202), robot controller 250 repeats the processing of step S200 and subsequent steps.

When all commands 158 are received (YES in step S202), robot controller 250 generates the target trajectory according to received command 158 (step S204). Then, the pieces of processing from step S200 are repeated.

On the other hand, as the processing related to command value generation module 290, robot controller 250 determines whether the next control period arrives (step S250).

When the next control period does not arrive (NO in step S250), robot controller 250 waits for the processing until the next control period arrives.

When the next control period arrives (YES in step S250), robot controller 250 determines whether the output condition of the command value to robot 200 is satisfied (step S252). The output condition of the command value to robot 200 may be defined by appropriately combining the latest output value transmitted from control device 100, the state value held by management module 286, the state value acquired by robot controller 250, and another arbitrary information.

When the output condition of the command value to robot 200 is not satisfied (NO in step S252), robot controller 250 skips the pieces of processing of steps S254 and S256.

When the output condition of the command value to robot 200 is satisfied (YES in step S252), robot controller 250 sequentially generates the command value for driving each axis of robot 200 so as to provide the behavior instructed by command 158 from control device 100 (steps S254 to S256). More specifically, robot controller 250 generates the command value for each motor 230 constituting robot 200 to be controlled according to the previously-generated target trajectory (step S254). Then, robot controller 250 outputs each generated command value (step S256).

Then, the pieces of processing from step S250 are repeated.

I. APPENDIX

The above embodiment includes the following technical ideas.

[Configuration 1]

A robot control system (1) comprising:
a first control device (100); and
a second control device (250) network-connected to the first control device and configured to control a robot (200),
wherein the first control device comprises;
 a selection unit (157) configured to enable any one of a plurality of sources that provide information about generation of a command (158) instructing behavior of the robot, and
 a first communication unit (50) configured to transmit a command generated according to the information from the enabled source in the plurality of sources to the second control device, and
the second control device comprises;
 a second communication unit (60) configured to receive the command transmitted from the first control device, and
 a command value generation unit (290) configured to sequentially generate a command value for driving each axis of the robot so as to provide the behavior instructed by the command from the first control device.

[Configuration 2]

The robot control system according to claim 1, wherein the plurality of sources comprise a plurality of units among:
a program interpretation unit (154) configured to sequentially execute a robot program (1108);
an operation unit (300) that is network-connected to the first control device and configured to generate an operation instruction according to a user operation;

a development support device (400) connected to the first control device and configured to provide information according to a user operation or program execution; and a program execution unit (150) configured to execute an IEC program (1104).

[Configuration 3]

The robot control system according to claim 1 or 2, wherein the selection unit is configured to enable a specific source according to an instruction given from an outside to the first control device.

[Configuration 4]

The robot control system according to any one of claims 1 to 3, wherein the selection unit is configured to determine the enabled source according to a predetermined setting.

[Configuration 5]

The robot control system according to claim 4, wherein the predetermined setting comprises a priority for a source, and the selection unit is configured to enable the source having a higher priority when information is provided from each of the plurality of sources.

[Configuration 6]

The robot control system according to any one of claims 1 to 5, wherein the first communication unit is configured to notify the second control device which source is enabled by the selection unit.

[Configuration 7]

The robot control system according to claim 6, wherein the command value generation unit is configured to vary a generation characteristic of the command value for driving each axis of the robot according to which source is enabled by the selection unit.

[Configuration 8]

A control method in a robot control system (1) comprising a first control device (100) and a second control device (250) network-connected to the first control device and configured to control a robot (200), the control method comprising:

enabling (S152), by the first control device, any one of a plurality of sources that provide information about generation of a command instructing behavior of the robot;

transmitting (S172), by the first control device, a command generated according to the information from the enabled source in the plurality of sources to the second control device;

receiving (S200), by the second control device, the command transmitted from the first control device; and generating (S254 to S256), by the second control device, sequentially a command value for driving each axis of the robot so as to provide the behavior instructed by the command from the first control device.

J. ADVANTAGES

In robot control system 1 according to the present embodiment, the plurality of sources can be selectively enabled, so that robot 200 can be controlled according to not only control by an original robot program 1108 but also information from other sources. As a result, robot control system 1 can be flexibly operated.

In robot control system 1 according to the present embodiment, control device 100 and robot controller 250 are linked to control the behavior of robot 200. The processing load can be distributed by adopting such the configuration.

As a result, even when the processing capability of control device 100 is not high, the behaviors of the plurality of robots 200 can be controlled.

It should be considered that the disclosed embodiment is an example in all respects and not restrictive. The scope of the present invention is defined by not the above description, but the claims, and it is intended that all modifications within the meaning and scope of the claims are included in the present invention.

REFERENCE SIGNS LIST

1: robot control system, 12: higher-order network, 20: field network, 50, 60: communication unit, 100: control device, 102, 262, 362, 402: processor, 104, 266, 366, 404: main memory, 106: higher-order network controller, 108, 252, 352: field network controller, 110, 270, 410: storage, 112: memory card interface, 114: memory card, 116: local bus controller, 118, 418: processor bus, 120, 420: USB controller, 122: local bus, 130: functional unit, 150: IEC program execution engine, 152: robot program execution engine, 154: robot program interpretation module, 156: command generation module, 157: source selection function, 158: command, 160, 280: communication control module, 162, 282: communication driver, 164: external communication interface, 200: robot, 200A: custom robot, 200B: general-purpose robot, 210: arm unit, 220: drive circuit, 230: motor, 250: robot controller, 260, 360: control processing circuit, 268, 368: interface circuit, 284: robot drive engine, 286: management module, 288: target trajectory generation module, 290: command value generation module, 292: signal output driver, 300: operation pendant, 370: firmware, 380: operation key group, 400: support device, 406: input unit, 408: display unit, 412: optical drive, 414: storage medium, 422: communication controller, 500: display device, 600: server device, 1102: system program, 1104: IEC program, 1108: robot program, 1109, 2704: setting information, 1502: output update processing, 1504: input update processing, 1562: command generation engine, 1572: internal selector, 1574, 2864: selection flag, 2702: robot system program, 4104: development program, T1: control period

The invention claimed is:

1. A robot control system comprising:

a first control device comprising first control processing circuitry; and a second control device that is network-connected through a network to the first control device and comprises second control processing circuitry configured to control a robot, wherein the first control processing circuitry is configured to:

generate a command that instructs a behavior of the robot by selecting one of a plurality of sources that are connectable to the first control processing circuitry and that provide information about generation of the command, the command being generated from the information from the one of the plurality of sources that is selected, and transmit the command that is generated and a selection flag indicating the one of the plurality of sources that is selected, to the second control device, and the second control processing circuitry is configured to:

receive the command and the selection flag, select a parameter set from among a plurality of parameter sets corresponding to the plurality of sources, based on the selection flag, and generate a command value for driving each axis of a plurality of axes of the robot, based on the command that is received and the parameter set that is selected, so as to provide the behavior instructed by the command.

2. The robot control system according to claim 1, wherein the plurality of sources comprise at least:
- a robot program executed by the first control processing circuitry of the first control device;
- an operation instruction according to a first user operation received by the first control device through the network;
- a development support computer connected to the first control device and comprising support processing circuitry configured to provide information according to a second user operation or program execution; and
- an IEC program executed by the first control processing circuitry of the first control device.

3. The robot control system according to claim 1, wherein the one of the plurality of sources is a specific source that is selected according to an instruction received by the first control processing circuitry from outside of the first control device.

4. The robot control system according to claim 1, wherein the one of the plurality of sources is selected according to a predetermined setting.

5. The robot control system according to claim 4, wherein the predetermined setting comprises priorities of the plurality of sources, and
- the one of the plurality of sources that is a source having a highest priority among the plurality of sources, based on the predetermined setting.

6. The robot control system according to claim 1, wherein the second processing circuitry is configured to vary a generation characteristic of the command value for driving each axis of the robot according to the parameter set that is selected.

7. The robot control system according to claim 1, wherein the first control processing circuitry comprises a first memory storing a first control program and a first processor configured to access the first memory and execute the first control program to cause the first processor to generate the command, and transmit the command that has been generated to the second control device.

8. The robot control system according to claim 1, wherein the second control processing circuitry comprises a second memory storing a second control program and a second processor configured to access the second memory and execute the second control program to cause the second processor to receive the command, and generate the command value for driving each axis of the robot, based on the command that has been received.

9. A control method in a robot control system comprising a first control device, and a second control device network-connected to the first control device through a network and configured to control a robot, the control method comprising:
- selecting, by the first control device, one of a plurality of sources that provide information about generation of a command instructing a behavior of the robot;
- generating, by the first control device, the command according to the information from the one of the plurality of sources that is selected;
- transmitting, by the first control device, the command that is generated and a selection flag indicating the one of the plurality of sources that is selected, to the second control device;
- receiving, by the second control device, the command and the selection flag;
- selecting a parameter set from among a plurality of parameter sets corresponding to the plurality of sources, based on the selection flag, and
- generating, by the second control device, a command value for driving each axis of a plurality of axes of the robot, based on the command and the parameter set that is selected, so as to provide the behavior instructed by the command.

10. The control method according to claim 9, wherein the plurality of sources comprise at least:
- a robot program executed by the first control device;
- an operation instruction according to a first user operation received by the first control device through the network;
- a development support computer connected to the first control device and configured to provide information according to a second user operation or program execution; and
- an IEC program executed by the first control device.

11. The control method according to claim 9, wherein the one of the plurality of sources is selected based on an instruction received from outside of the first control device.

12. The control method according to claim 9, wherein the selecting comprises determining the one of the plurality of sources according to a predetermined setting.

13. The control method according to claim 12, wherein the predetermined setting comprises priorities of the plurality of sources, and
- the one of the plurality of sources that is selected is a source having a highest priority among the plurality of sources.

14. The control method according to claim 9, further comprising varying a generation characteristic of the command value for driving each axis of the robot according to the parameter set that is selected.

* * * * *